(12) United States Patent  
Tanaka

(10) Patent No.: US 9,753,257 B2  
(45) Date of Patent: Sep. 5, 2017

(54) IMAGING LENS AND IMAGING APPARATUS EQUIPPED WITH THE IMAGING LENS

(71) Applicant: FUJIFILM Corporation, Tokyo (JP)

(72) Inventor: Takuya Tanaka, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 144 days.

(21) Appl. No.: 14/940,145

(22) Filed: Nov. 13, 2015

(65) Prior Publication Data

US 2016/0139372 A1 May 19, 2016

(30) Foreign Application Priority Data

Nov. 17, 2014 (JP) .................................. 2014-232674

(51) Int. Cl.
- *G02B 9/64* (2006.01)
- *G02B 13/18* (2006.01)
- *G02B 3/02* (2006.01)
- *G02B 13/00* (2006.01)

(52) U.S. Cl.
CPC ............ *G02B 13/0045* (2013.01); *G02B 9/64* (2013.01)

(58) Field of Classification Search
CPC ............................... G02B 13/0045; G02B 9/64
USPC ................................................ 359/708, 755
See application file for complete search history.

(56) References Cited

U.S. PATENT DOCUMENTS

| | | | |
|---|---|---|---|
| 9,116,329 B2 | 8/2015 | Fukaya | |
| 2014/0139931 A1 | 5/2014 | Kubota | |
| 2016/0109687 A1* | 4/2016 | Son ........................ | G02B 13/04 348/294 |
| 2016/0170180 A1* | 6/2016 | Son ..................... | G02B 13/0045 359/708 |

FOREIGN PATENT DOCUMENTS

| | | |
|---|---|---|
| JP | 2014-102358 | 6/2014 |
| JP | 2014-102408 | 6/2014 |

* cited by examiner

*Primary Examiner* — Bumsuk Won  
*Assistant Examiner* — Collin X Beatty  
(74) *Attorney, Agent, or Firm* — Jiang Chyun Intellectual Property Office

(57) ABSTRACT

An imaging lens consisting essentially of, in order from the object side, a first lens having a negative refractive power with the object side surface having a concave shape, a second lens, a third lens, a fourth lens, a fifth lens, a sixth lens, and a seventh lens having a negative refractive power with the image side surface having a concave shape with at least one inflection point, in which an aperture stop is provided between the first lens and the fifth lens, and the imaging lens satisfies predetermined conditional expressions. One of the second lens and the third lens has a positive refractive power and the other has a negative refractive power, and one of the fifth lens and the sixth lens has a positive refractive power and the other has a negative refractive power.

20 Claims, 14 Drawing Sheets

EXAMPLE 1

EXAMPLE 1

EXAMPLE 2

EXAMPLE 3

EXAMPLE 4

EXAMPLE 5

EXAMPLE 6

EXAMPLE 1

FIG.9 EXAMPLE 2

IMAGING LENS AND IMAGING APPARATUS EQUIPPED WITH THE IMAGING LENS

CROSS-REFERENCE TO RELATED APPLICATIONS

The present application claims priority under 35 U.S.C. §119 to Japanese Patent Application No. 2014-232674 filed on Nov. 17, 2014. The above application is hereby expressly incorporated by reference, in its entirety, into the present application.

BACKGROUND

The present disclosure relates to a fixed-focus imaging lens that forms an optical image of a subject on an image sensor such as, for example, a charge coupled device (CCD) or a complementary metal oxide semiconductor (CMOS), and an imaging apparatus equipped with the imaging lens to perform imaging, such as a digital still camera, a surveillance camera, a camera equipped cell phone, a personal digital assistance (PDA), a smartphone, a tablet terminal, a portable game machine, or the like.

Along with a widespread use of personal computers in homes, digital still cameras capable of inputting image information, such as captured landscapes and portraits, to personal computers are spreading rapidly. In addition, more and more cell phones, smartphones, and tablet terminals are equipped with camera modules for inputting images. Such devices having imaging capabilities use image sensors, such as CCDs, CMOSs, and the like. Recently, as downsizing of these image sensors have advanced, imaging devices as a whole and imaging lenses to be equipped therein are also demanded to be downsized. At the same time, higher pixelation of image sensors is also in progress, and high resolution and high performance are demanded for imaging lenses. For example, performance compatible with 5 mega pixels or greater, more preferably, 8 mega pixels or greater is demanded.

For such demands, imaging lenses composed of a relatively large number of lenses, i.e., five lenses or more are proposed. Japanese Unexamined Patent Publication No. 2014-102408 and Japanese Unexamined Patent Publication No. 2014-102358 propose a seven-element imaging lens to achieve a reduction in overall length, a small F-number, and an increase in angle of view.

SUMMARY

In the meantime, sufficient correction in longitudinal chromatic aberration, lateral chromatic aberration, and distortion is demanded for imaging lenses with a relatively short overall lens length used, in particular, for portable terminals, smartphones, or tablet terminals, in addition to the foregoing requirements.

The imaging lens described in Japanese Unexamined Patent Publication No. 2014-102408 is, however, insufficient in correcting lateral chromatic aberration and distortion, while the imaging lens described in Japanese Unexamined Patent Publication No. 2014-102358 is insufficient in correcting longitudinal chromatic aberration.

The present disclosure has been developed in view of the circumstances described above, and the present disclosure provides an imaging lens well-corrected in longitudinal chromatic aberration, lateral chromatic aberration, and distortion and is capable of realizing high imaging performance from the central angle of view to the peripheral angle of view, and an imaging apparatus capable of capturing a high resolution image by equipping the imaging lens.

An image lens of the present disclosure consists of seven lenses, composed of, from the object side, a first lens having a negative refractive power with the object side surface having a concave shape, a second lens, a third lens, a fourth lens, a fifth lens, a sixth lens, and a seventh lens having a negative refractive power with the image side surface having a concave shape with at least one inflection point located radially inward of the intersection between the image side surface and the principal ray of the maximum angle of view, wherein an aperture stop is provided between the first lens and the fifth lens, one of the second lens and the third lens has a positive refractive power and the other of the second lens and the third lens has a negative refractive power, one of the fifth lens and the sixth lens has a positive refractive power and the other of the fifth lens and the sixth lens has a negative refractive power, and the following conditional expressions are satisfied:

$$30 < \nu P1 - \nu N1 < 50 \tag{1}$$

$$30 < \nu P2 - \nu N2 < 50 \tag{2}$$

where

νP1 is the Abbe number of either one of the second lens and the third lens having a positive refractive power with respect to the d-line;

νN1 is the Abbe number of either one of the second lens and the third lens having a negative refractive power with respect to the d-line;

νP2 is the Abbe number of either one of the fifth lens and the sixth lens having a positive refractive power with respect to the d-line; and νN2 is the Abbe number of either one of the fifth lens and the sixth lens having a negative refractive power with respect to the d-line.

In the imaging lens of the present disclosure, the term "consists of seven lenses" refers to include the case in which that the imaging lens of the present disclosure includes a lens having substantially no refractive power, an optical element other than a lens, such as a stop, a cover glass, and the like, a lens flange, a lens barrel, an image sensor, and a mechanical component, for example, a camera shake correction mechanism, other than the seven lenses. The surface shapes and the signs of refractive powers of the foregoing lenses are considered in the paraxial region if an aspherical surface is involved.

Employment of the following preferable configurations in the imaging lens of the present disclosure may further improve the optical performance.

In the imaging lens of the present disclosure, the aperture stop is preferably located between the third lens and the fourth lens, or between the fourth lens and fifth lens.

In the imaging lens of the present disclosure, it is preferable that the fifth lens has a negative refractive power and the sixth lens has a positive refractive power.

In the imaging lens of the present disclosure, the sixth lens preferably has a biconvex shape.

In the imaging lens of the present disclosure, the seventh lens preferably has a biconcave shape.

In the imaging lens of the present disclosure, it is preferable that the second lens has a positive refractive power and the third lens has a negative refractive power.

In the imaging lens of the present disclosure, the fourth lens preferably has a positive refractive power.

In the imaging lens of the present disclosure, the object side surface of the first lens preferably has at least one inflection point located radially inward of the intersection between the object side surface and the principal ray of the maximum angle of view.

The imaging lens of the present disclosure may satisfy any one or any combination of the following conditional expressions (3) to (7) and (1-1) to (7-1).

$$30 < vP1 - vN1 < 40 \quad (1\text{-}1)$$

$$30 < vP2 - vN2 < 40 \quad (2\text{-}1)$$

$$0 < f/f67 < 2 \quad (3)$$

$$0 < f/f67 < 1 \quad (3\text{-}1)$$

$$0 < f/f12 < 2 \quad (4)$$

$$0 < f/f1 < 1 \quad (4\text{-}1)$$

$$0.1 < D2/(f \tan \omega) < 0.3 \quad (5)$$

$$-2 < f/f1 < 0 \quad (6)$$

$$-1 < f/f1 < 0 \quad (6\text{-}1)$$

$$-3 < f/f7 < 0 \quad (7)$$

$$-2.5 < f/f7 < -1 \quad (7\text{-}1)$$

where vP1 is the Abbe number of either one of the second lens and the third lens having a positive refractive power with respect to the d-line;

vN1 is the Abbe number of either one of the second lens and the third lens having a negative refractive power with respect to the d-line;

vP2 is the Abbe number of either one of the fifth lens and the sixth lens having a positive refractive power with respect to the d-line;

vN2 is the Abbe number of either one of the fifth lens and the sixth lens having a negative refractive power with respect to the d-line;

f is the focal length of the entire system;

f67 is the combined focal length of the sixth lens and the seventh lens;

f12 is the combined focal length of the first lens and the second lens;

D2 is the distance between the first lens and the second lens on the optical axis;

ω is the maximum half angle of view when an object at infinity is in focus;

f1 is the focal length of the first lens; and f7 is the focal length of the seventh lens.

An imaging apparatus according to the present disclosure is equipped with the imaging lens of the present disclosure.

According to the imaging lens of the present disclosure, the configuration of each lens element is optimized in a lens configuration of seven elements in total. This allows realization of a lens system well-corrected in longitudinal chromatic aberration, lateral chromatic aberration, and distortion, and has high imaging performance from the central angle of view to the peripheral angle of view.

According to the imaging apparatus of the present disclosure, a high resolution image may be captured because the apparatus is configured to output an imaging signal according to an optical image formed by any of the high performance imaging lenses of the present disclosure.

DETAILED DESCRIPTION OF THE PREFERRED EMBODIMENTS

Hereinafter, embodiments of the present disclosure will be described in detail with reference to the accompanying drawings.

Figure 1:
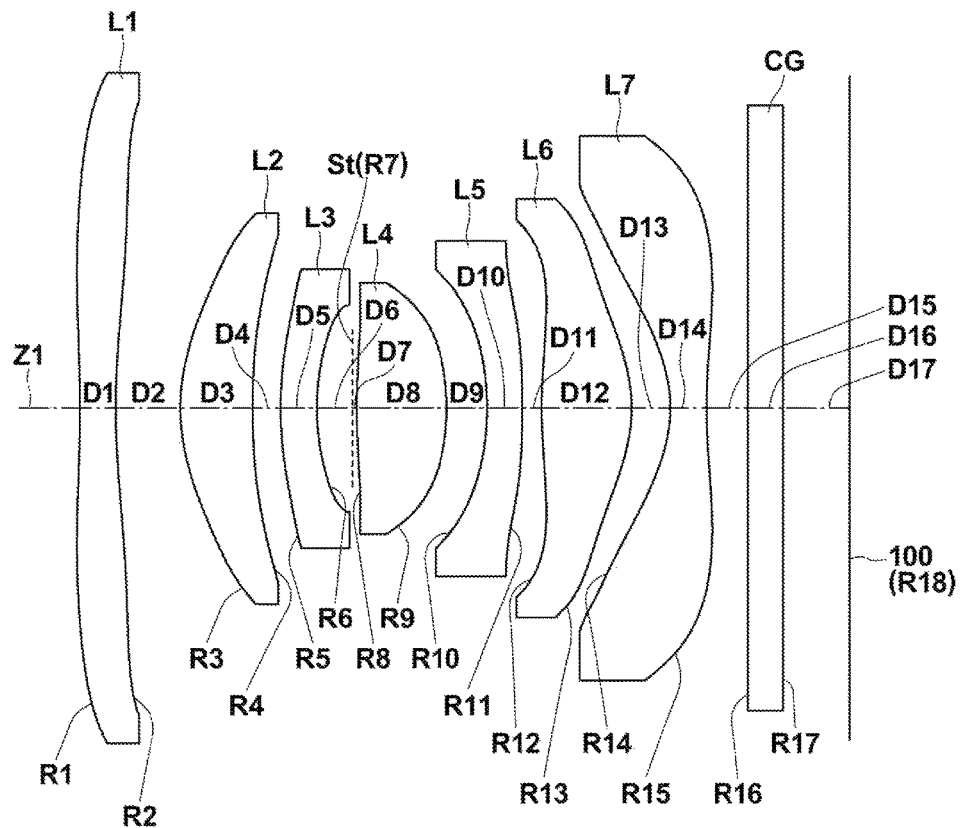
FIG. 1 is a cross-sectional view of an imaging lens according to one embodiment of the present disclosure, illustrating a first configuration example, which corresponds to Example 1.
Figure 2:
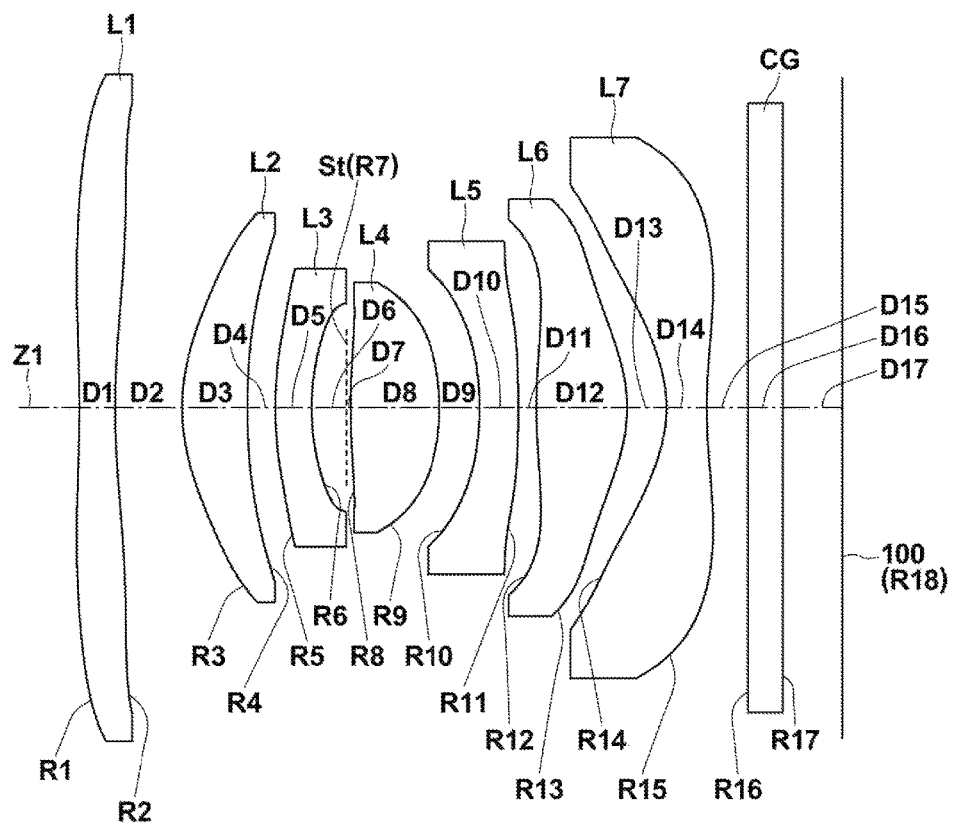
FIG. 2 is a cross-sectional view of an imaging lens according to one embodiment of the present disclosure, illustrating a second configuration example, which corresponds to Example 2.
Figure 3:
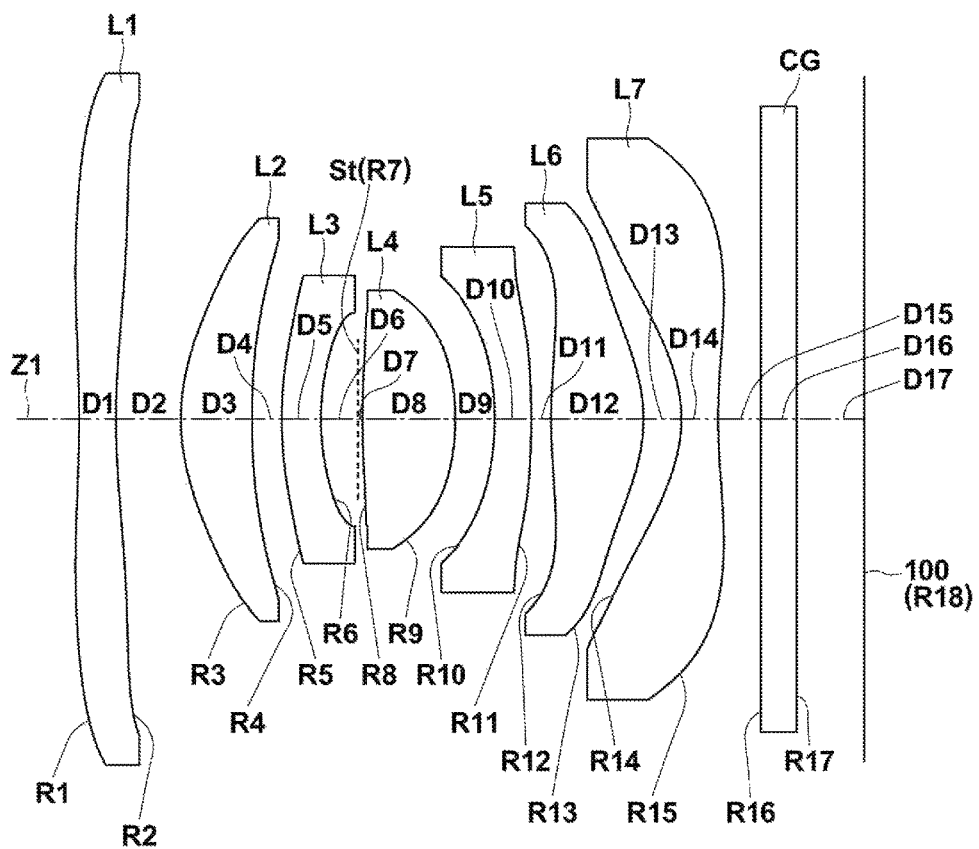
FIG. 3 is a cross-sectional view of an imaging lens according to one embodiment of the present disclosure, illustrating a third configuration example, which corresponds to Example 3.
Figure 4:
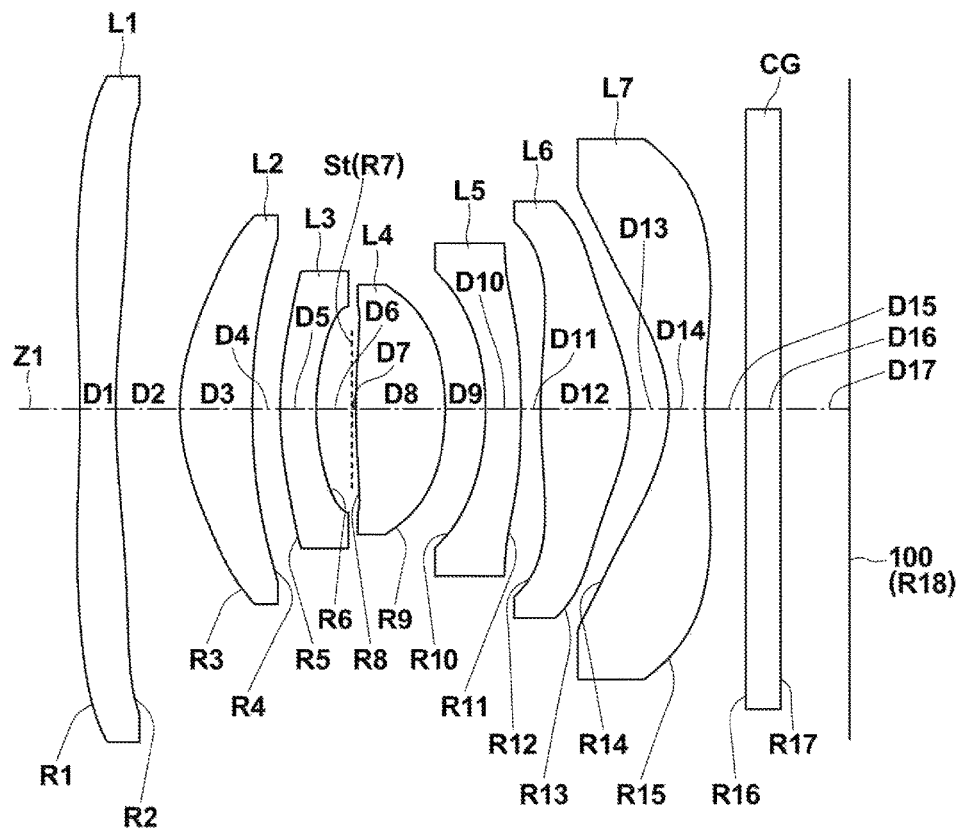
FIG. 4 is a cross-sectional view of an imaging lens according to one embodiment of the present disclosure, illustrating a fourth configuration example, which corresponds to Example 4.
Figure 5:
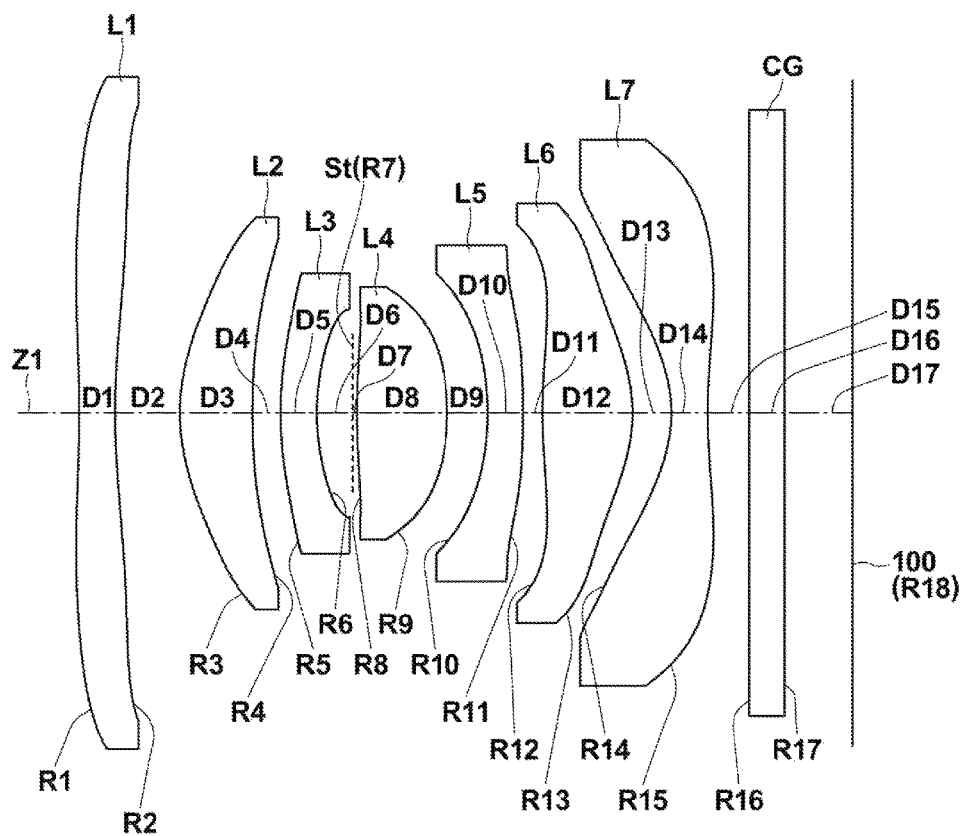
FIG. 5 is a cross-sectional view of an imaging lens according to one embodiment of the present disclosure, illustrating a fifth configuration example, which corresponds to Example 5.
Figure 6:
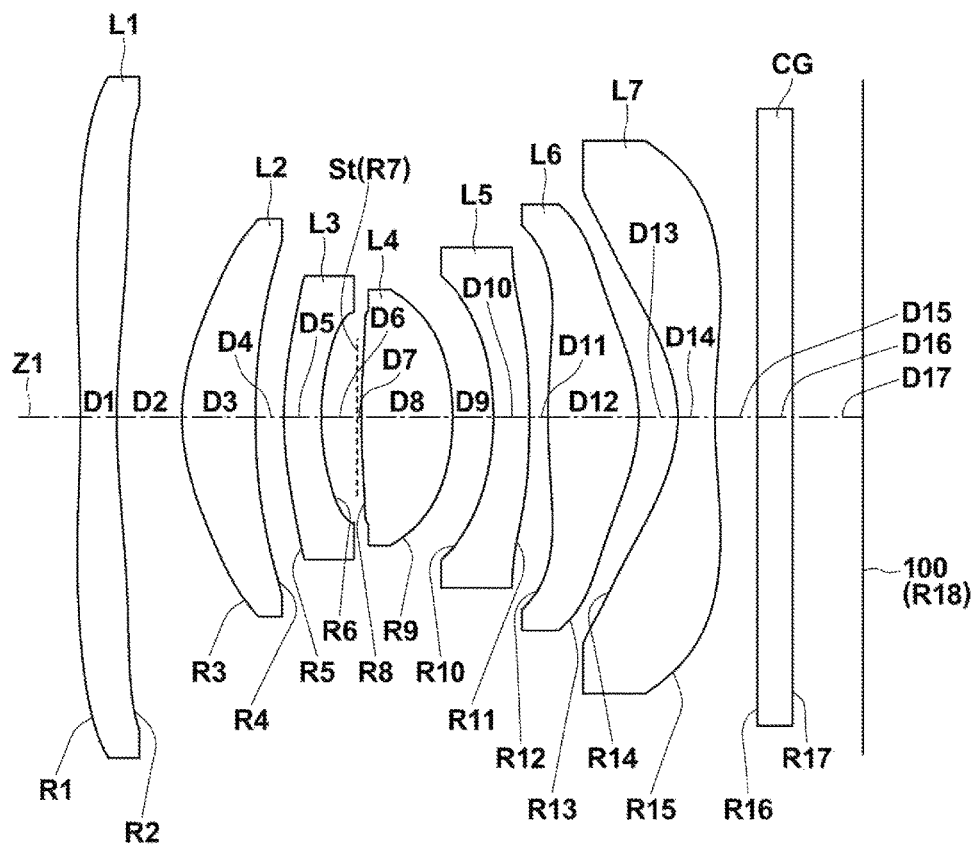
FIG. 6 is a cross-sectional view of an imaging lens according to one embodiment of the present disclosure, illustrating a sixth configuration example, which corresponds to Example 6.
Figure 7:
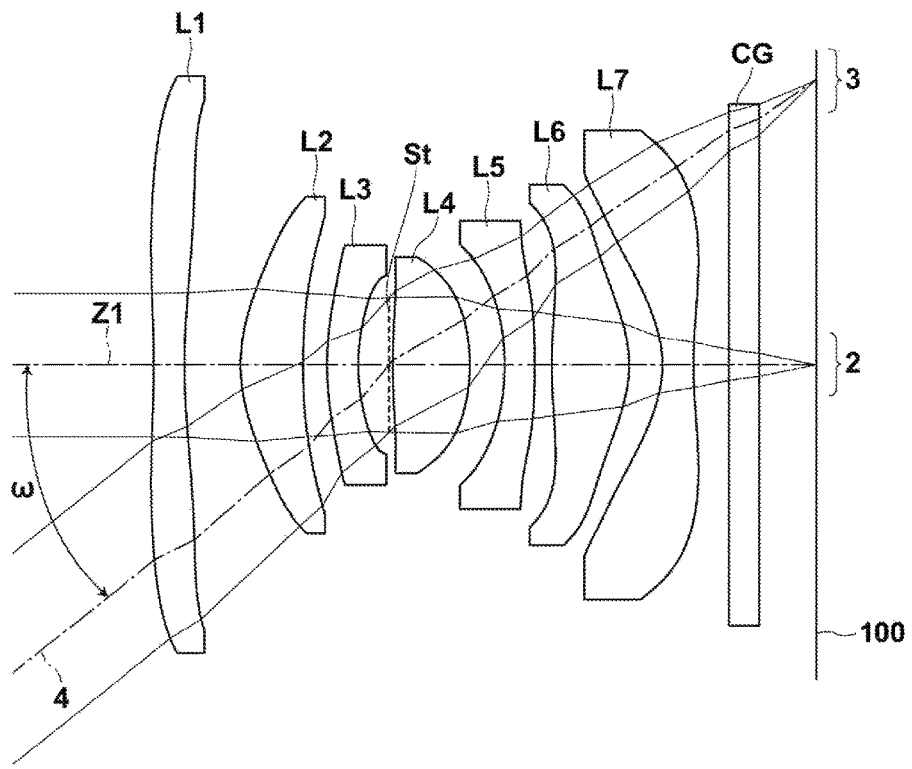
FIG. 7 is a ray diagram of the imaging lens illustrated in FIG. 1.

FIG. 1 illustrates a first configuration example of an imaging lens according to a first embodiment of the present disclosure. This configuration example corresponds to the lens configuration of a first numerical example (Tables 1 and 2) to be described later. Likewise, second to sixth configuration examples in cross-section corresponding to numerical examples (Tables 3 to 12) according to the second to sixth embodiments, to be described later, are shown in FIG. 2 to FIG. 6 respectively. In FIG. 1 to FIG. 6, the symbol Ri indicates a radius of curvature of $i^{th}$ surface in which a number i is given to each surface in a serially increasing manner toward the image side (imaging side) with the most object side lens element surface being taken as the first surface. The symbol Di indicates a surface distance between $i^{th}$ surface and $(i+1)^{th}$ surface on the optical axis Z1. As the basic configuration of each configuration example is identical, a description will be made, hereinafter, based on the configuration example of imaging lens shown in FIG. 1, and the configuration examples shown in FIG. 2 to FIG. 6 will be described, as required. FIG. 7 is a ray diagram of the imaging lens shown in FIG. 1, illustrating each optical path of an axial light beam 2 and a maximum angle of view light beam 3, and a maximum half angle of view ω when an object at infinity is in focus. Note that the principal ray 4 of the maximum angle of view light beam 3 is illustrated by a dot-and-dash line.

An imaging lens L according to an embodiment of the present disclosure is suitable for use in various types of imaging devices and systems that use image sensors such as, for example, a CCD and a CMOS, in particular, relatively small portable terminal devices and systems, including digital still cameras, camera-equipped cell phones, smartphones, tablet terminals, and PDAs. The imaging lens L includes a first lens L1, a second lens L2, a third lens L3, a fourth lens L4, a fifth lens L5, a sixth lens L6, and seventh lens L7 in order from the object side along the optical axis Z1.

Figure 14:
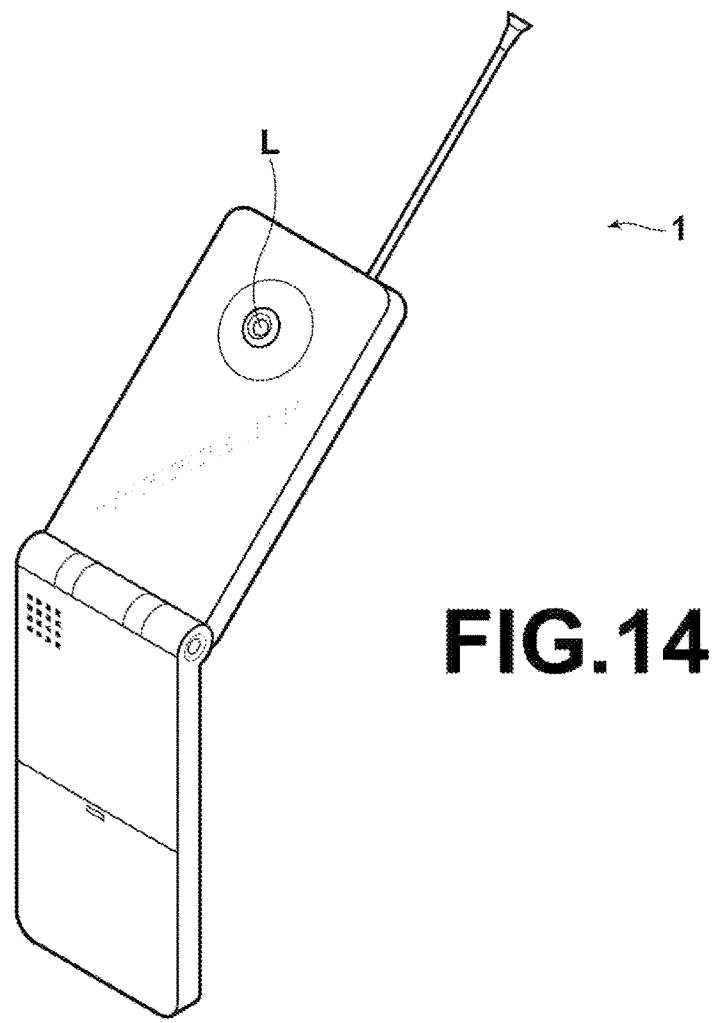
FIG. 14 illustrates an imaging apparatus, which is a cell phone terminal, equipped with the imaging lens according to the present disclosure.

FIG. 14 is a schematic view of a cell phone terminal which is an imaging apparatus 1 according to an embodiment of the present disclosure. The imaging apparatus 1 according to an embodiment of the present disclosure includes the imaging lens L according to the present embodiment and an image sensor 100 (refer to FIG. 1 to FIG. 6), such as a CCD, that outputs an imaging signal according to an optical image formed by the imaging lens L. The image sensor 100 is disposed on the imaging surface (image plane R18 in FIG. 1 to FIG. 6) of the imaging lens L.

Figure 15:
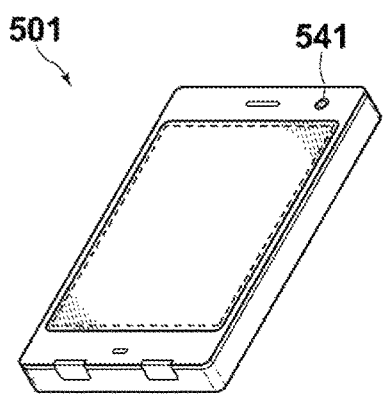
FIG. 15 illustrates an imaging apparatus, which is a smartphone, equipped with the imaging lens according to the present disclosure.

FIG. 15 is a schematic view of a smartphone which is an imaging apparatus 501 according to an embodiment of the present disclosure. The imaging apparatus 501 according to an embodiment of the present disclosure includes a camera section 541 which includes the imaging lens L according to the present embodiment and an image sensor 100 (refer to FIG. 1 to FIG. 6), such as a CCD, that outputs an imaging signal according to an optical image formed by the imaging lens L. The image sensor 100 is disposed on the imaging surface (image plane) of the imaging lens L.

Various types of optical members CG may be disposed between the seventh lens L7 and the image sensor 100 according to the camera side structure to which the lens is mounted. For example, a plate-like optical member, for example, a cover glass for protecting the image plane or an infrared cut filter may be disposed. In this case, for example, a plate-like cover glass with a coating having a filtering effect, such as an infrared cut filter or an ND filter, or with a material having an identical effect may be used as the optical member CG.

Further, an effect comparable to that of the optical member CG may be given by applying a coating on the seventh lens L7, without using the optical member CG This allows a reduction in the number of parts and the overall length.

The imaging lens L includes an aperture stop St disposed between the first lens L1 and the fifth lens L5. The aperture stop St may be disposed between the first lens L 1 and the second lens L2, between the second lens L2 and the third lens L3, between the third lens L3 and the fourth lens L4, or between the fourth lens L4 and the fifth lens L5, as long as it is disposed between the first lens L1 and the fifth lens L5. Disposing the aperture stop St between the first lens L 1 and the fifth lens L5 makes it easy to dispose the first lens L1 to the seventh lens L7 such that the refractive power of one or more lenses disposed on the object side of the aperture stop St and the refractive power of the other lenses disposed on the image side of the aperture stop St are substantially symmetrical, whereby distortion and lateral chromatic aberration may be well corrected. The aperture stop St is preferably disposed between the third lens L3 and the fourth lens L4 or between the fourth lens L4 and the fifth lens L5 to further enhance this effect. In the present embodiment, the lenses of the first to the sixth configuration examples (FIG. 1 to FIG. 6) are configuration examples in which the aperture stop St is disposed between the third lens L3 and the fourth lens L4. Disposing the aperture stop St between the third lens L3 and the fourth lens L4 allows incident angles of light rays passing through the optical system with respect to the imaging surface (image sensor) to be further prevented from increasing, in particular, in a peripheral portion of the imaging area, in comparison with a case where the aperture stop is disposed between the fourth lens L4 and the fifth lens L5. The aperture stop St shown here does not necessarily represent the size or the shape but the position on the optical axis Z1.

The first lens L1 has a negative refractive power near the optical axis. The seventh lens L7 has a negative refractive power. Giving a negative refractive power to the first lens L1 located on the most object side of the imaging lens L and a negative refractive power to the seventh lens L7 located on the most image side of the imaging lens L, and symmetrically arranging the refractive power of the lens located on the most object side of the imaging lens L and the refractive power of the lens located on the most image side of the imaging lens L with respect to the aperture stop St allows distortion and lateral chromatic aberration generated in the seventh lens L7 to be well corrected at a low angle of view.

The object side surface of the first lens L1 has a concave shape near the optical axis. The image side surface of the seventh lens L7 has a concave shape near the optical axis. In this way, giving a concave shape toward the object side to the object side surface of the first lens L1 located on the most object side of the imaging lens L and a concave shape toward the image side to the image side surface of the seventh lens L7 located on the most image side of the imaging lens L, and symmetrically arranging the surface shape located on the most object side of the imaging lens L and the surface shape located on the most image side of the imaging lens L with respect to the aperture stop St allows distortion and lateral chromatic aberration generated in the seventh lens L7 to be well corrected.

Further, the object side surface of the first lens L1 preferably has an aspherical shape with at least one inflection point located radially inward from the intersection between the object side surface and the principal ray of the maximum angle of view toward the optical axis. The image side surface of the seventh lens L7 has an aspherical shape with at least one inflection point located radially inward from the intersection between the image side surface and the principal ray of the maximum angle of view toward the optical axis. In a case where the object side surface of the first lens L1 has an aspherical surface with the foregoing inflection point, the object side surface of the first lens L1 which is the most object side surface of the imaging lens L has a concave shape toward the object side near the optical axis and is aspherical with an inflection point, while the image side surface of the seventh lens L7 which is the most image side surface of the imaging lens L has a concave shape toward the image side near the optical axis, and is aspherical with an inflection point. This allows the surface shape located on the most object side of the imaging lens L and the surface shape located on the most image side of the imaging lens L to be arranged substantially symmetrically with respect to the aperture stop St, whereby distortion that occurs in a peripheral portion of the seventh lens L7 may be well corrected.

The term "inflection point" on the object side surface of the first lens L1 refers to a point where the surface shape of the object side surface changes from a convex shape to a concave shape (or from a concave shape to a convex shape) toward the object side. The term "radially inward from the intersection between the object side surface and the principal ray of the maximum angle of view toward the optical axis" as used herein refers to the same position as the intersection between the object side surface and the principal ray of the maximum angle of view or a position located further radially inward from the intersection toward the optical axis. The inflection point on the object side surface of the first lens L1 may be disposed at the same position as the intersection between the object side surface of the first lens L1 and the principal ray of the maximum angle of view or at any position further radially inward from the intersection toward the optical axis. Likewise, the term "inflection point" on the image side surface of the seventh lens L7 refers to a point where the surface shape of the image side surface changes from a convex shape to a concave shape (or from a concave shape to a convex shape) toward the image side. The inflection point on the image side surface of the seventh lens L7 may be disposed at the same position as the intersection between the image side surface of the seventh lens L7 and the principal ray of the maximum angle of view or at any position further radially inward from the intersection toward the optical axis.

The first lens L1 preferably has a biconcave shape near the optical axis. This allows the first lens L1 to have a concave shape on the image side near the optical axis, whereby generation of spherical aberration may be suppressed.

One of the second lens L2 and the third lens L3 has a positive refractive power near the optical axis and the other has a negative refractive power near the optical axis. Adjacently disposing a lens having a positive refractive power and a lens having a negative refractive power allows various aberrations, in particular, spherical aberration to be well corrected.

For example, the second lens L2 may have a positive refractive power near the optical axis, while the third lens L3 may have a negative refractive power near the optical axis. In this case, the second lens L2 makes it easy to secure a positive refractive power of the imaging lens L, which is advantageous for reducing the overall length. Further, the second lens L2 preferably has a meniscus shape with a convex surface on the object side near the optical axis. In this case, the rear principal point of the second lens L2 may be shifted easily to the object side, which is further advantageous for reducing the overall length.

In a case where the third lens L3 has a negative refractive power near the optical axis, spherical aberration generated in the second lens L2 may be well corrected. Further, the third lens L3 preferably has a meniscus shape with a convex surface on the object side near the optical axis. This allows generation of astigmatism and high-order spherical aberrations to be suppressed.

The fourth lens L4 may have a negative or positive refractive power near the optical axis if it is capable of correcting various aberrations generated while light rays pass through the imaging lens L in a well-balanced manner. In a case where the fourth lens L4 has a positive refractive power near the optical axis, the positive refractive power of the imaging lens L may be increased sufficiently, while suppressing generation of distortion, since the fourth lens L4 located substantially in the middle of the imaging lens L in an optical axis direction has a positive refractive power near the optical axis. The fourth lens L4 preferably has a biconvex shape near the optical axis. This allows the positive refractive power of each surface of the fourth lens L4 to be prevented from increasing too large, while securing an appropriate positive refractive power by both of the object side surface and the image side surface of the fourth lens L4, whereby generation of spherical aberration may be well suppressed.

One of the fifth lens L5 and the sixth lens L6 has a positive refractive power near the optical axis and the other has a negative refractive power near the optical axis. Adjacently disposing a lens having a positive refractive power and a lens having a negative refractive power allows various aberrations, in particular, spherical aberration to be well corrected.

For example, the fifth lens L5 may have a negative refractive power near the optical axis, while the sixth lens L6 may have a positive refractive power near the optical axis. In this case, spherical aberration and astigmatism may be well corrected, since the fifth lens L5 has a negative refractive power near the optical axis. Further, the fifth lens L5 preferably has a meniscus shape with a concave surface on the object side near the optical axis. This allows generation of astigmatism to be further suppressed.

In a case where the sixth lens L6 has a positive refractive power near the optical axis, a positive refractive power may be disposed at a position relatively close to the image plane (refer to R18 in FIG. 1 to FIG. 6), which is advantageous for correcting distortion and lateral chromatic aberration generated when light rays pass through the seventh lens L7 having a negative refractive power. Further, the sixth lens L6 preferably has a biconvex shape near the optical axis. This allows the positive refractive power of each surface of the sixth lens L6 to be prevented from increasing too large, while securing an appropriate positive refractive power by both of the object side surface and the image side surface of the sixth lens L6, whereby astigmatism may be corrected in a well-balanced manner.

The seventh lens L7 has a negative refractive power near the optical axis. Giving a negative refractive power to the seventh lens L7 near the optical axis which is the lens disposed on the most image side of the imaging lens L allows the rear principal point of the imaging lens L to be shifted to the object side, whereby the overall lens length may be reduced satisfactorily. Further, the seventh lens L7 has a concave surface on the image side near the optical axis. This allows field curvature to be well corrected, while realizing a favorable reduction in overall lens length. The seventh lens L7 may have a biconcave shape near the optical axis. This allows the absolute value of curvature of each surface of the seventh lens L7 to be prevented from increasing too large, while securing an appropriate negative refractive power by both of the object side surface and the image side surface of the seventh lens L7, which is advantageous for reducing the overall lens length.

As described above, the image side surface of the seventh lens L7 has an aspherical shape with at least one inflection point located radially inward from the intersection between the image side surface and the principal ray of the maximum angle of view toward the optical axis. This allows incident angles of light rays passing through the optical system with respect to the imaging surface (image sensor) to be prevented from increasing, in particular, in a peripheral portion of the imaging area. Further, forming the image side surface of the seventh lens L7 in an aspherical shape with at least one inflection point located radially inward from the intersection between the image side surface and the principal ray of the maximum angle of view toward the optical axis allows distortion to be well corrected.

The use of single lenses for the first lens L1 to the seventh lens L7 constituting the imaging lens L described above may increase the number of lens surfaces in comparison with the case where a cemented lens is used for any of the first lens L1 to the seventh lens L7, whereby design flexibility may be increased and the overall lens length may be reduced satisfactorily.

According to the foregoing imaging lens L, the configuration of each lens element from the first lens L1 to the seventh lens L7 is optimized in a lens configuration of seven elements in total. This allows realization of a lens system well-corrected in longitudinal chromatic aberration, lateral chromatic aberration, and distortion, and has high imaging performance from the central angle of view to the peripheral angle of view.

Preferably, each of the first lens L1 to the seventh lens L7 of the imaging lens L has an aspherical shape on at least one surface for higher performance of the imaging lens L.

Next, operations and effects of the imaging lens L configured in the manner described above will be described in further detail with respect to conditional expressions. Preferably, the imaging lens L satisfies any one or any combination of the following conditional expressions. Preferably, a conditional expression to be satisfied by the imaging lens L is selected, as appropriate, according to the requirements of the imaging lens L.

The Abbe number $\nu P1$ with respect to the d-line of one of the second lens L2 and the third lens L3 having a positive refractive power and the Abbe number $\nu N1$ with respect to the d-line of one of the second lens L2 and the third lens L3 having a negative refractive power preferably satisfy the following conditional expression (1):

$$30 < \nu P1 - \nu N1 < 50 \quad (1).$$

The conditional expression (1) defines a preferable numerical range of the difference between the Abbe number $\nu P1$ with respect to the d-line of one of the second lens L2 and the third lens L3 having a positive refractive power and the Abbe number $\nu N1$ with respect to the d-line of one of the second lens L2 and the third lens L3 having a negative refractive power. Forming the second lens L2 and the third lens L3 with materials having dispersion powers that satisfy the conditional expression (1) allows longitudinal chromatic aberration to be well corrected. In order to further enhance the foregoing effects, it is preferable that the following conditional expression (1-1) is satisfied:

$$30 < \nu P1 - \nu N1 < 40 \quad (1-1).$$

The Abbe number $\nu P2$ with respect to the d-line of one of the fifth lens L5 and the sixth lens L6 having a positive refractive power and the Abbe number $\nu N2$ with respect to the d-line of one of the fifth lens L5 and the sixth lens L6 having a negative refractive power preferably satisfy the following conditional expression (2):

$$30 < \nu P2 - \nu N2 < 50 \quad (2).$$

The conditional expression (2) defines a preferable numerical range of the difference between the Abbe number $\nu P2$ with respect to the d-line of one of the fifth lens L5 and the sixth lens L6 having a positive refractive power and the Abbe number $\nu N2$ with respect to the d-line of one of the fifth lens L5 and the sixth lens L6 having a negative refractive power. Forming the fifth lens L5 and the sixth lens L6 with materials having dispersion powers that satisfy the conditional expression (2) allows longitudinal chromatic aberration to be well corrected. In order to further enhance the foregoing effects, it is preferable that the following conditional expression (2-1) is satisfied:

$$30 < \nu P2 - \nu N2 < 40 \quad (2-1).$$

The focal length f of the entire system and the combined focal length f67 of the sixth lens L6 and the seventh lens L7 preferably satisfy the following conditional expression (3):

$$0 < f/f67 < 2 \quad (3).$$

The conditional expression (3) defines a preferable numerical range of the ratio of the focal length f of the entire system with respect to the combined focal length f67 of the sixth lens L6 and the seventh lens L7. Securing the ratio of the focal length f of the entire system with respect to the combined focal length f67 of the sixth lens L6 and the seventh lens L7 so as to remain above the lower limit of the conditional expression (3) allows distortion and lateral chromatic aberration generated in the seventh lens L7 having a negative refractive power to be well corrected. Maintaining the ratio of the focal length f of the entire system with respect to the combined focal length f67 so as to remain below the upper limit of the conditional expression (3) may prevent the positive refractive power by the sixth lens L6 and the seventh lens L7 from being too strong relative to the positive refractive power of the entire system, whereby the rear principal point of the imaging lens L is prevented from being shifted to the image side by the positive refractive power of the sixth lens L6 and the seventh lens L7, which is advantageous for reducing the overall length. In order to further enhance the foregoing effects, it is more preferable that the following conditional expression (3-1) is satisfied:

$$0 < f/f67 < 1 \quad (3-1).$$

The focal length f of the entire system and the combined focal length f12 of the first lens L1 and the second lens L2 preferably satisfy the following conditional expression (4):

$$0 < f/f12 < 2 \quad (4).$$

The conditional expression (4) defines a preferable numerical range of the ratio of the focal length f of the entire system with respect to the combined focal length f12 of the first lens L1 and the second lens L2. Securing the ratio of the focal length f of the entire system with respect to the combined focal length f12 of the first lens L1 and the second lens L2 so as to remain above the lower limit of the conditional expression (4) may prevent the positive refractive power by the first lens L1 and the second lens L2 from being too weak relative to the positive refractive power of the entire lens system, which is advantageous for reducing the overall length. Maintaining the ratio of the focal length f of the entire system with respect to the combined focal length f12 so as to remain below the upper limit of the conditional expression (4) may prevent the positive refractive power by the sixth lens L6 and the seventh lens L7 from being too strong relative to the positive refractive power of the entire system, whereby spherical aberration may be well corrected. In order to further enhance the foregoing effects, it is more preferable that the following conditional expression (4-1) is satisfied:

$$0 < f/f12 < 1 \tag{4-1}$$

The distance D2 between the first lens L1 and the second lens L2 on the optical axis, the focal length f of the entire system, and the maximum half angle of view ω when an object at infinity is in focus preferably satisfy the following conditional expression (5):

$$0.1 < D2/(f \cdot \tan \omega) < 0.3 \tag{5}$$

The conditional expression (5) defines a preferable numerical range of the ratio of the distance D2 between the first lens L1 and the second lens L2 on the optical axis with respect to the paraxial image height (f·tan ω). Securing the distance D2 between the first lens L1 and the second lens L2 on the optical axis such that the value of the conditional expression (5) remains above the lower limit allows the correction effect of the distortion and lateral chromatic aberration to be obtained effectively. Suppressing the distance D2 between the first lens L1 and the second lens L2 on the optical axis such that the value of the conditional expression (5) remains below the upper limit may prevent the distance D2 between the first lens L1 and the second lens L2 on the optical axis from being too large relative to the focal length f of the entire system, whereby the overall lens length may be reduced satisfactorily.

The focal length f of the entire system and the focal length f1 of the first lens L1 preferably satisfy the following conditional expression (6):

$$-2 < f/f1 < 0 \tag{6}$$

The conditional expression (6) defines a preferable numerical range of the ratio of the focal length f of the entire system with respect to the focal length f1 of the first lens L1. Maintaining the focal length f of the entire system with respect to the focal length f1 of the first lens L1 such that the value of the conditional expression (6) remains above the lower limit may prevent the refractive power of the first lens L1 from being too strong relative to the refractive power of the entire system, whereby the overall length may be reduced satisfactorily. Securing the focal length f of the entire system with respect to the focal length f1 of the first lens L1 such that the value of the conditional expression (6) satisfies the upper limit allows distortion and lateral chromatic aberration to be well corrected. In order to further enhance the foregoing effects, it is more preferable that the following conditional expression (6-1) is satisfied:

$$-1 < f/f1 < 0 \tag{6-1}$$

The focal length f of the entire system and the focal length f7 of the seventh lens L7 preferably satisfy the following conditional expression (7):

$$-3 < f/f7 < 0 \tag{7}$$

The conditional expression (7) defines a preferable numerical range of the ratio of the focal length f of the entire system with respect to the focal length f7 of the seventh lens L7. Maintaining the focal length f of the entire system with respect to the focal length f7 of the seventh lens L7 such that the value of the conditional expression (7) remains above the lower limit may prevent the refractive power of the seventh lens L7 from being too strong relative to the refractive power of the entire system, whereby the absolute value of Petzval sum may be reduced appropriately. Securing the focal length f of the entire system with respect to the focal length f7 of the seventh lens L7 such that the value of the conditional expression (7) satisfy the upper limit may prevent the refractive power of the seventh lens L7 from being too weak relative to the refractive power of the entire system, which is advantageous for reducing the overall lens length. In order to further enhance the foregoing effects, it is more preferable that the following conditional expression (7-1) is satisfied:

$$-2.5 < f/f7 < -1 \tag{7-1}$$

As described above, according to the imaging lens L of an embodiment of the present disclosure, the configuration of each lens element is optimized in a lens configuration of seven elements in total. This allows realization of a lens system well-corrected in longitudinal chromatic aberration, lateral chromatic aberration, and distortion, and has high imaging performance from the central angle of view to the peripheral angle of view.

Satisfying a preferable condition, as appropriate, allows realization of higher imaging performance. According to the imaging apparatus of the present embodiment, a high resolution captured image may be obtained from the central angle of view to the peripheral angle of view, since the apparatus is configured to output an imaging signal according to an optical image formed by the imaging lens having high performance of the present embodiment.

For example, if the first lens L1 to the seventh lens L7 of the foregoing imaging lens L are configured so as to have a maximum angle of view of 75 degrees or more when an object at infinity is in focus, as in the imaging lenses according to the first to the sixth embodiments, it is easy to realize a reduction in overall lens length relative to the image size. Therefore, the imaging lens L may be favorably employed as an imaging lens for use with a portable terminal which requires an imaging lens having a relatively short overall lens length and a high resolution. Further, if the first lens L1 to the seventh lens L7 of the foregoing imaging lens L are configured so as to have an F-number smaller than 2.5 as in, for example, the imaging lenses according to the first to the sixth embodiments, the imaging lens may respond to the demand for a higher resolution.

Next, specific numerical examples of imaging lenses according to the embodiments of the present disclosure will be described. Hereinafter, a plurality of numerical examples is described collectively.

Tables 1 and 2, to be described later, show specific lens data corresponding to the configuration of the imaging lens illustrated in FIG. 1. More specifically, Table 1 shows basic lens data, while Table 2 shows aspherical surface data. The surface number Si column in the lens data shown in Table 1 indicates $i^{th}$ surface number of the imaging lens according to Example 1 in which a number i is given to each surface in a serially increasing manner toward the image side with the object side surface of the most object side optical element being taken as the first surface. The radius of curvature Ri column indicates the value (mm) of radius of curvature of $i^{th}$ surface from the object side in relation to the symbol Ri given in FIG. 1. Likewise, the surface distance Di column indicates the surface distance (mm) on the optical axis between $i^{th}$ surface Si and $(i+1)^{th}$ surface Si+1. The Ndj column indicates the value of the refractive index of $j^{th}$ optical element from the object side with respect to the d-line (wavelength of 587.6 nm) and the vdj column indicates the value of the Abbe number of $i^{th}$ optical element from the object side with respect to the d-line.

Table 1 also includes the aperture stop St and the optical member CG In Table 1, the term (St) is indicated in the surface number column of the surface corresponding to the aperture stop St in addition to the surface number, and the term (IMG) is indicated in the surface number column of the surface corresponding to the image plane in addition to the surface number. The sign of the radius of curvature is positive if the surface shape is convex on the object side and negative if it is convex on the image side. As various types of data, values of focal length f (mm) of the entire system, back focus Bf (mm), F-number Fno., and maximum angle of view 2ω(°) when an object at infinity is in focus are given in the upper margin of each lens data. Note that the back focus Bf indicates an air equivalent value.

In the imaging lens according to Example 1, both surfaces of the first lens L1 to the seventh lens L7 have aspherical surface shapes. As the radii of curvature of these aspherical surfaces, the basic lens data of Table 1 show numerical values of radii of curvature near the optical axis (paraxial radii of curvature).

Table 2 shows aspherical surface data of the imaging lens of Example 1. In a numerical value shown as aspherical surface data, the symbol "E" indicates that the subsequent numerical value is an "exponent" to base 10 and the numerical value preceding "E" is multiplied by the numerical value represented by the exponent to base 10. For example, "1.0E-02" represents "$1.0 \times 10^{-2}$".

As for the aspherical surface data, values of each coefficient An and KA in an aspherical surface shape formula represented by the following formula (A) are indicated. More specifically, Z indicates the length (mm) of a vertical line from a point on the aspheric surface at a height h to a tangential plane of the vertex of the aspherical surface (plane orthogonal to the optical axis).

$$Z = \frac{C \times h^2}{1 + \sqrt{1 - KA \times C^2 \times h^2}} + \sum_n An \times h^n \quad (A)$$

where:
Z: depth of the aspherical surface (mm)
h: distance from the optical axis to the lens surface (height) (mm)
C: paraxial curvature=1/R (R: paraxial radius of curvature)
An: $n^{th}$ order aspherical surface coefficient (n is an integer not less than 3)
KA: aspherical surface coefficient.

As in the foregoing imaging lens of Example 1, specific lens data corresponding to the imaging lens configurations illustrated in FIG. 2 to FIG. 6 are given in Tables 3 to 12, as Examples 2 to 6. In the imaging lenses according to Example 1 to 6, both surfaces of the first lens L1 to the seventh lens L7 have aspherical shapes.

Figure 8:
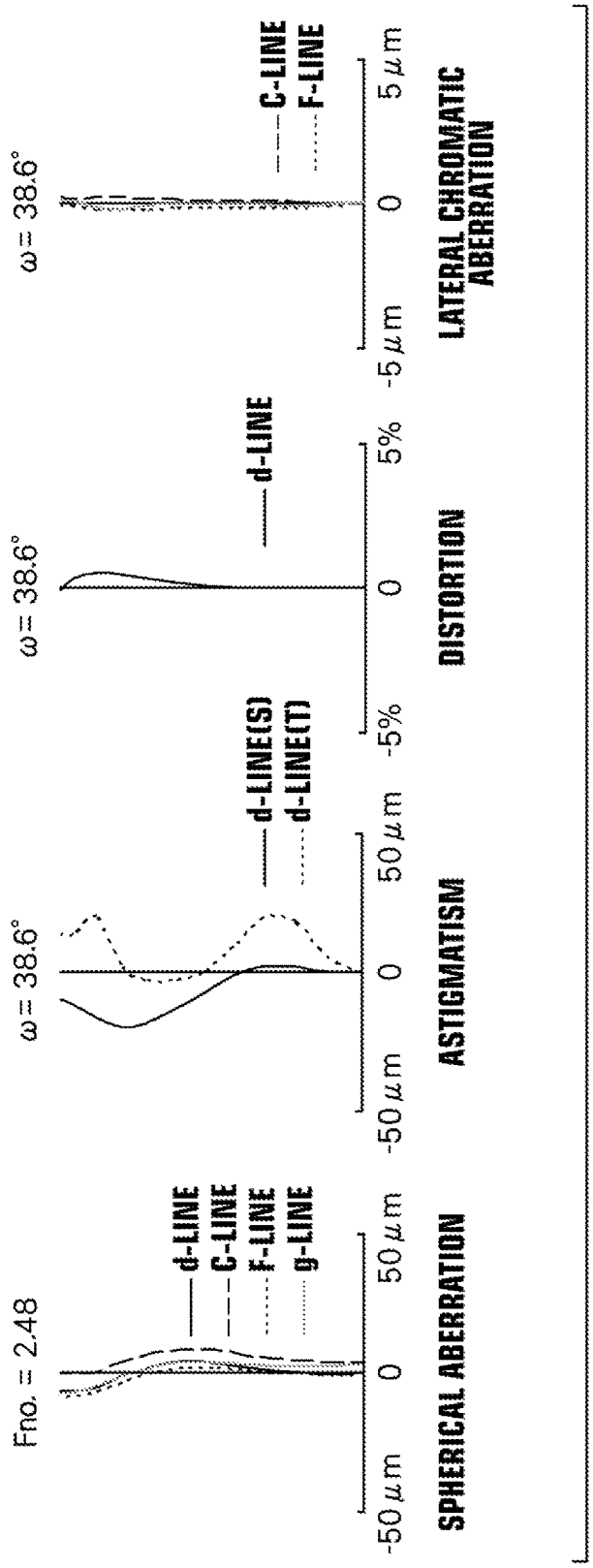
FIG. 8 shows aberration diagrams of the imaging lens according to Example 1 of the present disclosure, in which spherical aberration, astigmatism, distortion, and lateral chromatic aberration are illustrated in order from the left.
Figure 9:
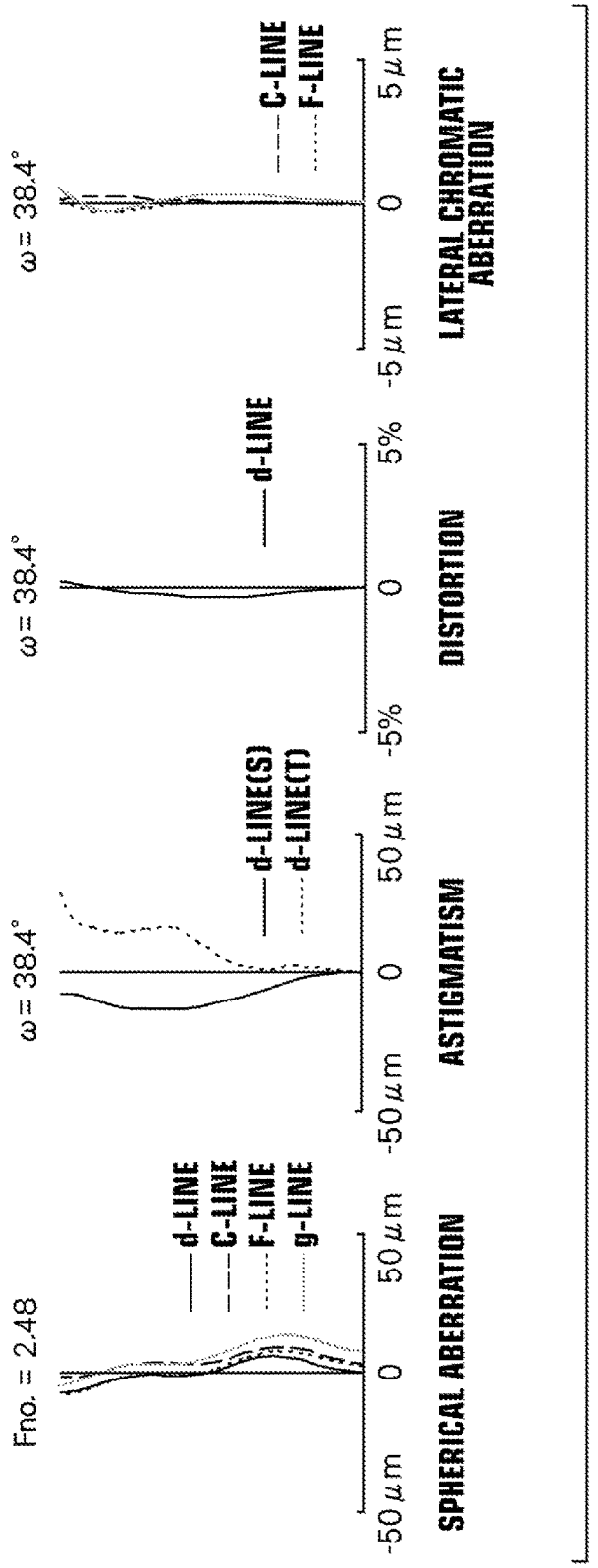
FIG. 9 shows aberration diagrams of the imaging lens according to Example 2 of the present disclosure, in which spherical aberration, astigmatism, distortion, and lateral chromatic aberration are illustrated in order from the left.
Figure 10:
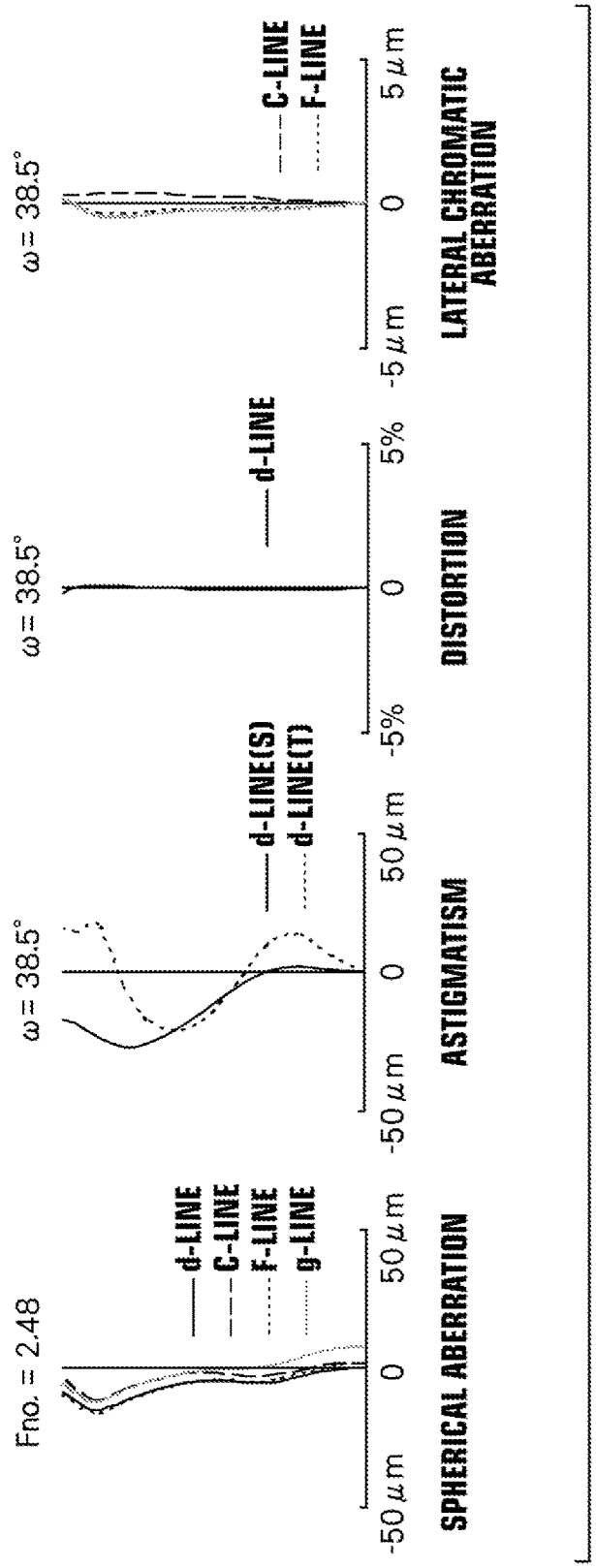
FIG. 10 shows aberration diagrams of the imaging lens according to Example 3 of the present disclosure, in which spherical aberration, astigmatism, distortion, and lateral chromatic aberration are illustrated in order from the left.
Figure 11:
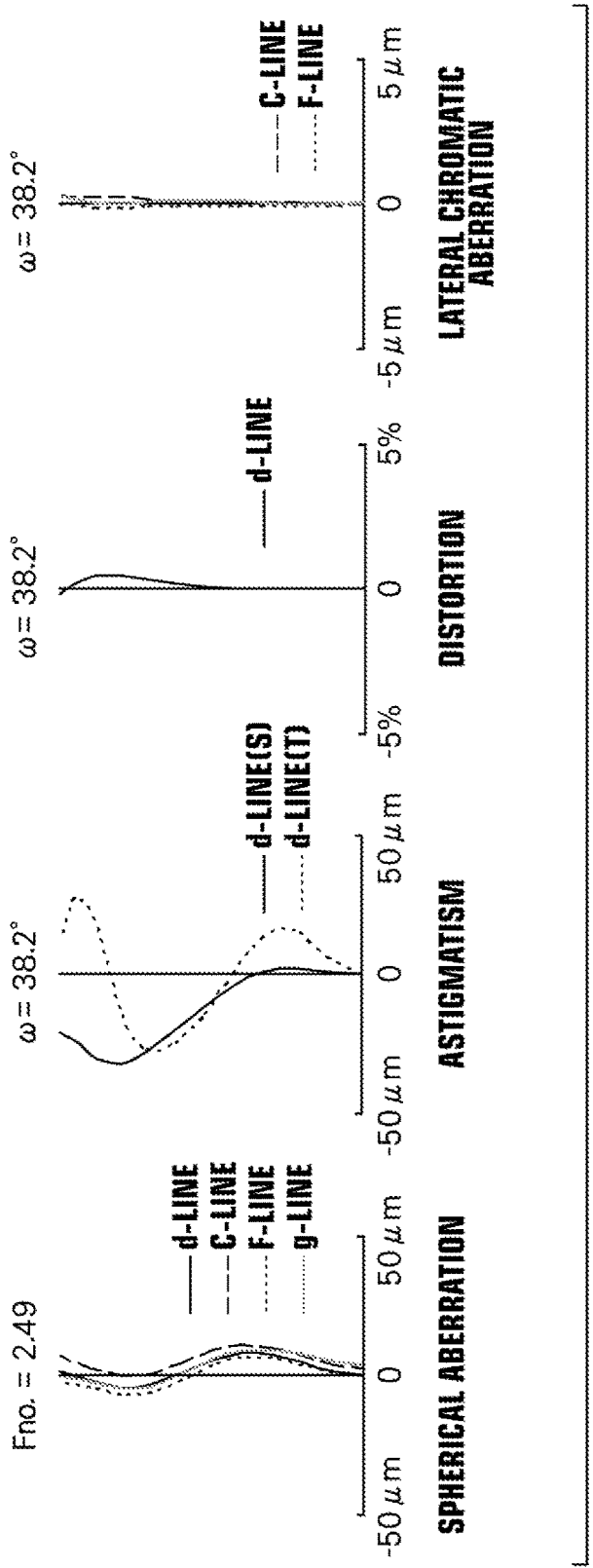
FIG. 11 shows aberration diagrams of the imaging lens according to Example 4 of the present disclosure, in which spherical aberration, astigmatism, distortion, and lateral chromatic aberration are illustrated in order from the left.
Figure 12:
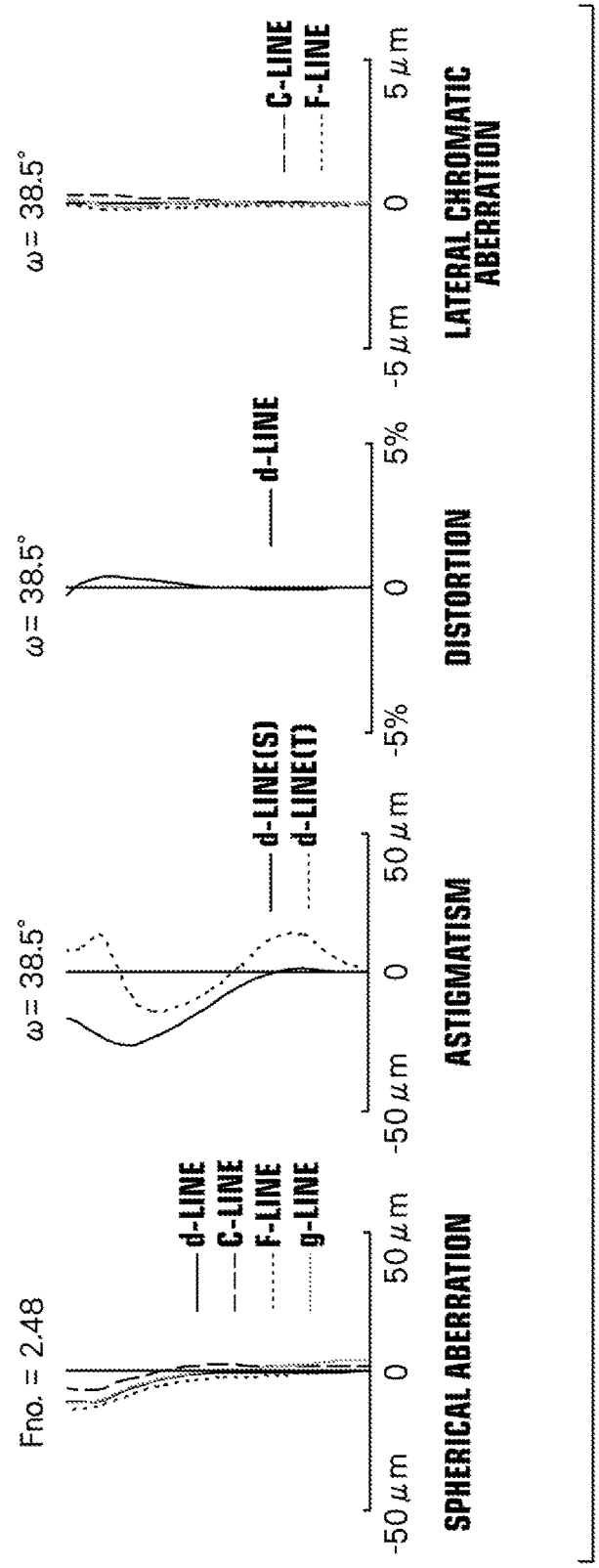
FIG. 12 shows aberration diagrams of the imaging lens according to Example 5 of the present disclosure, in which spherical aberration, astigmatism, distortion, and lateral chromatic aberration are illustrated in order from the left.
Figure 13:
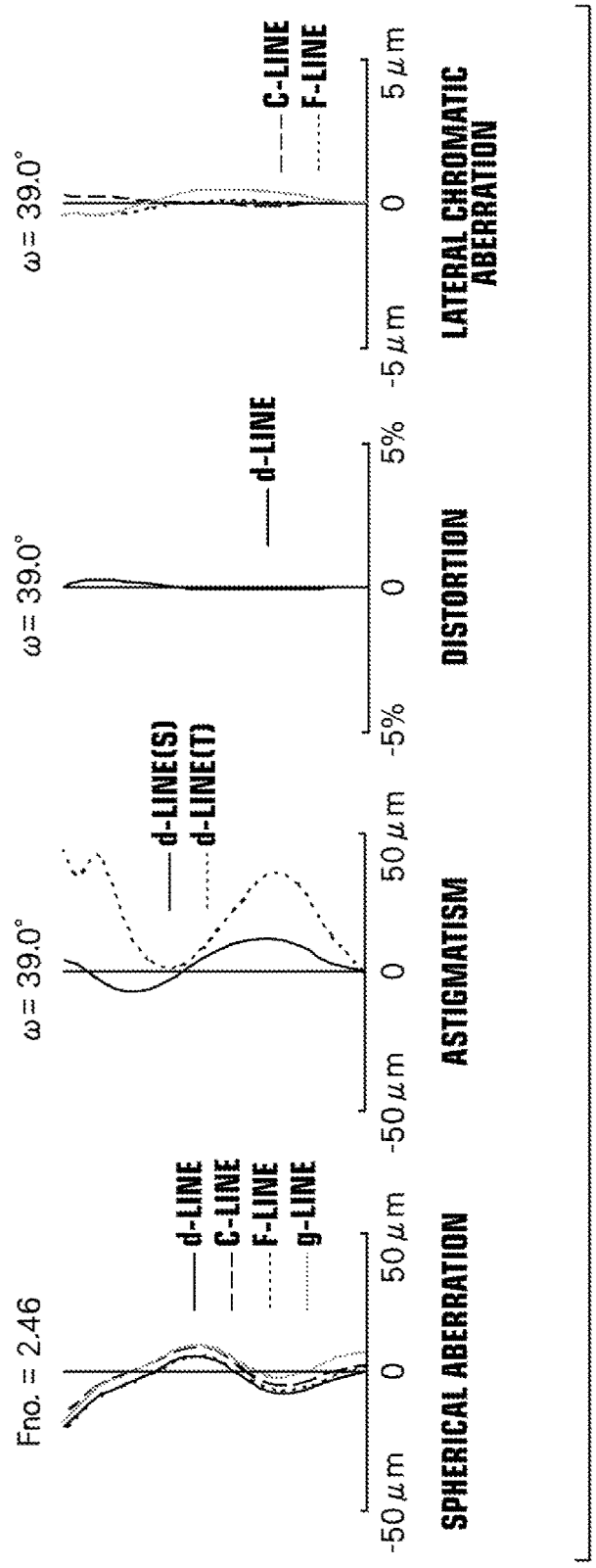
FIG. 13 shows aberration diagrams of the imaging lens according to Example 6 of the present disclosure, in which spherical aberration, astigmatism, distortion, and lateral chromatic aberration are illustrated in order from the left.

FIG. 8 shows aberration diagrams representing spherical aberration, astigmatism, distortion, and lateral chromatic aberration of Example 1 in order from the left. Each aberration diagram of spherical aberration, astigmatism (field curvature), and distortion illustrates aberration with the d-line (wavelength 587.6 nm) as the reference wavelength, but the spherical aberration diagram also illustrates aberrations with respect to the F-line (wavelength 486.1 nm), the C-line (wavelength 656.3 nm), and the g-line (wavelength 435.8 nm), while the lateral chromatic aberration diagram illustrates aberrations with respect to the F-line, the C-line, and the g-line. In the astigmatism diagram, the solid line illustrates aberration in the sagittal direction (S) and the broken line illustrates aberration in the tangential direction (T). The Fno. and ω represent the F-number and the maximum half angle of view when an object at infinity is in focus respectively.

Likewise, various types of aberrations of the imaging lenses of Examples 2 to 6 are illustrated in FIG. 9 to FIG. 13. The aberration diagrams shown in FIG. 8 to FIG. 13 are all in the case where the object distance is infinity.

Table 13 summarizes the values of the conditional expressions (1) to (7) according to the present disclosure for each of Examples 1 to 6.

As is known from each numerical data and each aberration diagram, longitudinal chromatic aberration, lateral chromatic aberration and distortion are well corrected for each example, in particular, distortion is very well corrected and high imaging performance is realized from the central angle of view to the peripheral angle of view.

It should be understood that the imaging lens of the present disclosure is not limited to the embodiments and each example described above, and various changes and modifications may be made. For example, values of radius of curvature, surface distance, refractive index, Abbe number, and aspherical surface coefficient of each lens component are not limited to those shown in each numerical example and may take other values.

Each example is described on the assumption that the imaging lens is used in fixed focus, but it is possible to take a configuration that allows focus adjustment. For example, it is possible to take a configuration that allows auto-focusing by, for example, paying out the entire lens system or moving some of the lenses on the optical axis.

TABLE 1

Example 1
f = 2.975, Bf = 0.940, Fno. = 2.48, 2ω = 77.2

| Si | Ri | Di | Ndj | vdj |
|---|---|---|---|---|
| *1 | −8.66012 | 0.255 | 1.54488 | 54.87 |
| *2 | 5.27980 | 0.466 | | |
| *3 | 1.42667 | 0.518 | 1.54488 | 54.87 |
| *4 | 6.12843 | 0.200 | | |
| *5 | 2.85872 | 0.258 | 1.63350 | 23.62 |
| *6 | 1.70792 | 0.256 | | |
| 7 (St) | ∞ | 0.030 | | |
| *8 | 5.67528 | 0.644 | 1.54488 | 54.87 |
| *9 | −1.67075 | 0.289 | | |
| *10 | −2.10560 | 0.252 | 1.63350 | 23.62 |
| *11 | −10.77297 | 0.141 | | |
| *12 | 3.52703 | 0.641 | 1.54488 | 54.87 |
| *13 | −1.11117 | 0.277 | | |
| *14 | −0.97217 | 0.258 | 1.54488 | 54.87 |
| *15 | 3.99984 | 0.300 | | |
| 16 | ∞ | 0.250 | 1.51633 | 64.14 |
| 17 | ∞ | 0.475 | | |
| 18 (IMG) | ∞ | | | |

*Aspherical Surface

TABLE 2

Example 1 · Aspherical Surface Data

| Si | KA | A3 | A4 | A5 | A6 |
|---|---|---|---|---|---|
| 1 | −3.7309634E+00 | 0.0000000E+00 | 7.6741312E−02 | −1.1790946E−01 | 2.7293854E−01 |
| 2 | 4.8234820E+00 | 0.0000000E+00 | −4.0878551E−02 | −2.2430463E−02 | 3.0294372E−02 |
| 3 | −4.4015081E+00 | 0.0000000E+00 | 1.1888667E−01 | −5.5577137E−03 | −2.5312647E−01 |
| 4 | 4.4712603E+00 | 0.0000000E+00 | 1.0130145E−01 | 2.9057039E−02 | −4.6158516E−01 |
| 5 | 5.8458207E+00 | 0.0000000E+00 | 1.1835243E−02 | −1.4763258E−02 | 1.1322825E+00 |
| 6 | 5.2784180E+00 | 0.0000000E+00 | −1.8506679E−02 | 2.9324381E−01 | −2.0178788E−01 |
| 8 | −1.6383112E+01 | 0.0000000E+00 | −3.6000169E−02 | 2.2043948E−02 | 6.5839581E−02 |
| 9 | 2.8966861E+00 | 0.0000000E+00 | −3.6899939E−02 | −2.3666097E−01 | 8.3575545E−02 |
| 10 | 7.5109828E−01 | 0.0000000E+00 | −2.1331164E−01 | 8.5457032E−02 | 1.1406745E+00 |
| 11 | −1.8532279E+00 | 0.0000000E+00 | −3.6188792E−01 | 2.4172908E−01 | 7.8171763E−01 |
| 12 | −1.7035388E+00 | 0.0000000E+00 | −3.7865533E−01 | 3.9631587E−01 | 1.8827800E−01 |
| 13 | −3.1498362E+00 | 0.0000000E+00 | −2.9123184E−02 | 2.7484992E−02 | 1.1188927E−01 |
| 14 | −3.2414251E+00 | 0.0000000E+00 | −9.2143294E−02 | −1.5699400E−02 | 1.4495469E−01 |
| 15 | −1.9999994E+01 | 0.0000000E+00 | −1.0299732E−01 | 5.6182040E−02 | 5.8197041E−03 |

| Si | A7 | A8 | A9 | A10 | A11 |
|---|---|---|---|---|---|
| 1 | −4.8261300E−01 | 5.1233645E−01 | −3.0833743E−01 | 7.3975149E−02 | 2.8110697E−02 |
| 2 | 3.6398617E−03 | −1.2494705E−02 | 2.2436712E−03 | 5.8627408E−04 | 6.9732680E−04 |
| 3 | 2.4250446E−01 | −2.0605794E−01 | 2.6757532E−01 | 1.8219707E−02 | −2.2318051E−01 |
| 4 | 8.0989685E−01 | 3.1885079E−01 | −3.8972229E+00 | 7.2359327E+00 | −6.1055331E+00 |
| 5 | −9.3512053E+00 | 2.9138124E+01 | −4.5098713E+01 | 2.9210665E+01 | 1.4468917E+00 |
| 6 | −1.7404636E+00 | 2.8107185E+00 | −5.9261902E+00 | 1.9999341E+01 | −8.1909496E+00 |
| 8 | −9.7387687E−01 | −6.7560960E−01 | 1.0712148E+01 | −7.7799891E+00 | −3.6762906E+01 |
| 9 | 6.6396163E−03 | 2.3258236E+00 | −5.4649637E+00 | 3.8825244E+00 | −5.0461905E+00 |
| 10 | −4.0335992E+00 | 5.4072089E+00 | −3.8831134E+00 | 8.5344318E+00 | −1.7534494E+01 |
| 11 | −1.3928199E+00 | 3.5198431E−01 | 1.7085237E−01 | 5.4378137E−01 | 8.3563917E−01 |
| 12 | −5.6072159E−01 | 3.9481515E−02 | 3.4692662E−01 | −3.0911889E−02 | −2.3525893E−01 |
| 13 | −3.9737598E−02 | 6.7702993E−03 | −2.8660615E−02 | −4.2931044E−02 | 1.0679615E−02 |
| 14 | −1.3010610E−02 | −1.2687199E−01 | −1.1540371E−01 | 4.0959333E−01 | −2.3119722E−01 |
| 15 | −1.5332599E−01 | 3.5624285E−01 | −4.2701524E−01 | 3.2451149E−01 | −1.7014831E−01 |

| Si | A12 | A13 | A14 | A15 | A16 |
|---|---|---|---|---|---|
| 1 | −2.7356849E−02 | 8.1871587E−03 | −7.0151037E−04 | −1.4779895E−04 | 2.8097284E−05 |
| 2 | −3.2288820E−04 | −3.5273820E−05 | 1.6363646E−06 | 6.1978737E−06 | −2.7068922E−09 |
| 3 | −3.7211134E−01 | 9.3434929E−01 | −6.5549950E−01 | 1.7614741E−01 | −1.1735307E−02 |
| 4 | 2.9072092E−01 | 4.8787557E+00 | −4.8568545E+00 | 1.9845259E+00 | −2.9581552E−01 |
| 5 | 7.2085516E+00 | −5.0215103E+01 | 6.7990592E+01 | −4.2262567E+01 | 1.0724360E+01 |
| 6 | −5.6539017E+01 | 4.1361339E+01 | 7.4827769E+01 | −5.9289485E+01 | −1.7204844E+01 |
| 8 | 3.8402804E+01 | 9.3415271E+01 | −1.9961417E+02 | 1.3283688E+02 | −2.9888100E+01 |
| 9 | 2.2490628E+00 | 2.8088633E+01 | −4.5133709E+01 | 1.5956934E+01 | 3.4538541E+00 |
| 10 | 6.3684267E+00 | 1.7663069E+01 | −1.5359956E+01 | −2.3623578E+00 | 4.0675551E+00 |
| 11 | −2.0199541E+00 | −2.2719182E−01 | 1.9025658E+00 | −1.0289341E+00 | 1.4318904E−01 |
| 12 | 4.2240994E−02 | 1.0764442E−01 | −8.6889442E−03 | −5.0311222E−02 | 1.7613837E−02 |
| 13 | 3.9106236E−02 | −1.1048100E−02 | −1.6173589E−03 | −5.6062006E−03 | 2.8113961E−03 |
| 14 | −5.1865375E−03 | −5.7588891E−03 | 1.9110926E−02 | 4.9620669E−03 | −4.1984304E−03 |
| 15 | 5.4790476E−02 | −2.4327287E−03 | −5.7935797E−03 | 1.9592250E−03 | −1.8097384E−04 |

TABLE 3

Example 2
f = 2.985, Bf = 0.893, Fno. = 2.48, 2ω = 76.8

| Si | Ri | Di | Ndj | vdj |
|---|---|---|---|---|
| *1 | −8.90613 | 0.256 | 1.54488 | 54.87 |
| *2 | 5.56656 | 0.486 | | |
| *3 | 1.42150 | 0.471 | 1.54488 | 54.87 |
| *4 | 5.81957 | 0.200 | | |
| *5 | 2.87373 | 0.260 | 1.63350 | 23.62 |
| *6 | 1.71667 | 0.251 | | |
| 7 (St) | ∞ | 0.030 | | |
| *8 | 5.34697 | 0.640 | 1.54488 | 54.87 |
| *9 | −1.65126 | 0.289 | | |
| *10 | −2.19445 | 0.277 | 1.63350 | 23.62 |
| *11 | −49.98205 | 0.133 | | |
| *12 | 3.33372 | 0.651 | 1.54488 | 54.87 |
| *13 | −1.10449 | 0.283 | | |
| *14 | −0.98834 | 0.289 | 1.54488 | 54.87 |
| *15 | 3.63991 | 0.300 | | |
| 16 | ∞ | 0.250 | 1.51633 | 64.14 |
| 17 | ∞ | 0.428 | | |
| 18 (IMG) | ∞ | | | |

*Aspherical Surface

TABLE 4

Example 2 · Aspherical Surface Data

| Si | KA | A3 | A4 | A5 | A6 |
|---|---|---|---|---|---|
| 1 | −3.7309634E+00 | 0.0000000E+00 | 6.9762682E−02 | −3.7308214E−02 | 4.3070001E−05 |
| 2 | 4.8234820E+00 | 0.0000000E+00 | −3.4195280E−02 | −2.0913096E−02 | 2.1964750E−03 |
| 3 | −4.4015081E+00 | 0.0000000E+00 | 1.1864563E−01 | −1.7014567E−02 | −1.1911600E−01 |
| 4 | 4.4712603E+00 | 0.0000000E+00 | 1.0489649E−01 | −6.4797581E−03 | −2.5623630E−01 |
| 5 | 5.8458207E+00 | 0.0000000E+00 | −4.0126871E−03 | 2.3436873E−01 | −1.0415983E+00 |
| 6 | 5.2784180E+00 | 0.0000000E+00 | −1.1248435E−01 | 3.1530293E−01 | −1.3112659E+00 |
| 8 | −1.6383112E+01 | 0.0000000E+00 | −1.8412784E−02 | 3.5398369E−02 | 1.6122142E−01 |
| 9 | 2.8966861E+00 | 0.0000000E+00 | −7.7658348E−02 | −2.1978859E−01 | 5.1629715E−01 |
| 10 | 7.5109828E−01 | 0.0000000E+00 | −2.0182270E−01 | −3.8423876E−02 | 1.0202147E+00 |
| 11 | −1.8532279E+00 | 0.0000000E+00 | −4.6252314E−01 | 2.2572422E−01 | 1.0859537E+00 |
| 12 | −1.7035388E+00 | 0.0000000E+00 | −4.3865545E−01 | 3.7293041E−01 | 4.5514461E−01 |
| 13 | −3.1498362E+00 | 0.0000000E+00 | −3.4138178E−02 | 2.1008941E−02 | 1.5625394E−01 |
| 14 | −3.2414251E+00 | 0.0000000E+00 | −7.7076752E−02 | 3.8599893E−03 | 6.1531735E−02 |
| 15 | −1.9999994E+01 | 0.0000000E+00 | −9.2317044E−02 | 1.4308650E−02 | 1.0556087E−01 |

| Si | A7 | A8 | A9 | A10 | A11 |
|---|---|---|---|---|---|
| 1 | 5.7189295E−03 | −5.2358188E−03 | 5.8374587E−03 | −2.6762189E−03 | −7.3704492E−04 |
| 2 | 3.0598625E−03 | −7.8705935E−03 | 2.9489210E−03 | −1.7600547E−03 | 1.6105906E−03 |
| 3 | −1.8007609E−01 | 4.5638773E−01 | −2.9426090E−01 | 2.9991872E−01 | −5.6916528E−01 |
| 4 | 4.7221015E−01 | −2.8937893E−01 | −3.0239251E−01 | 5.8383918E−01 | −8.5211502E−01 |
| 5 | 1.4199489E+00 | −5.0207368E−01 | −4.4272148E−01 | −2.3844202E+00 | 4.2955015E+00 |
| 6 | −1.6039866E+00 | 1.0051395E+01 | −5.7121505E−01 | −2.7502018E+01 | −1.6642528E+01 |
| 8 | −2.8280062E+00 | 4.8707760E+00 | 9.6349165E+00 | −3.0659926E+01 | 8.3360445E+00 |
| 9 | −6.7418226E−02 | −4.4172506E−01 | −2.6005817E+00 | 5.9929939E+00 | −6.4028022E+00 |
| 10 | −3.3493241E+00 | 4.8048678E+00 | −4.7612783E+00 | −3.1381286E+00 | −5.4981096E+00 |
| 11 | −1.2181164E+00 | −2.7651757E−01 | −9.5962388E−01 | 3.4521934E+00 | −4.5087407E−01 |
| 12 | −7.2253774E−01 | 2.7922765E−02 | −4.5134818E−04 | 3.4999022E−01 | −7.1599494E−02 |
| 13 | 2.2922743E−04 | −1.5281911E−01 | 3.4977254E−02 | 3.7610730E−03 | 2.9117404E−02 |
| 14 | 1.1495902E−01 | −4.2403227E−01 | 3.2561961E−01 | 5.8274056E−02 | −2.7395994E−02 |
| 15 | −2.9045560E−01 | 3.6706001E−01 | −1.8950310E−01 | −3.1397861E−02 | 7.7206638E−02 |

| Si | A12 | A13 | A14 | A15 | A16 |
|---|---|---|---|---|---|
| 1 | 9.6479993E−04 | −1.9591363E−04 | −9.0582926E−06 | −4.7705144E−06 | 2.7215650E−06 |
| 2 | −8.8518626E−04 | 4.3219972E−04 | −1.6624779E−04 | 2.7276020E−05 | −1.4712007E−07 |
| 3 | 3.3244660E−01 | 1.5348739E−01 | −1.7425500E−01 | 9.4006703E−03 | 1.4432520E−02 |
| 4 | 1.1708141E+00 | −6.6589926E−01 | 1.2580507E−02 | 5.3662570E−02 | 7.5088561E−03 |
| 5 | −2.2235265E−01 | −5.2088435E−01 | −2.2381378E+00 | 9.4967881E−01 | 3.7315094E−01 |
| 6 | 9.8353924E+01 | −4.6109134E+01 | 1.7351169E+01 | −1.1567826E+02 | 8.3957043E+01 |
| 8 | 1.7342024E+01 | 1.9269531E+01 | −4.4304322E+00 | −7.0216501E+01 | 4.9480376E+01 |
| 9 | 8.6756726E+00 | −6.7335398E+00 | 6.4817108E−01 | −2.5536988E+00 | 3.2512013E+00 |
| 10 | 1.0368184E+01 | −1.4834473E+00 | 4.1711325E+00 | −1.3024776E+01 | 6.7106559E+00 |
| 11 | −3.7127929E+00 | 2.6851255E+00 | −3.6779451E−01 | −4.4577341E−02 | −3.6170306E−02 |
| 12 | −1.3012963E−01 | −1.4744898E−01 | 2.9626949E−01 | −1.5699085E−01 | 2.8858911E−02 |
| 13 | −1.9666046E−02 | 6.7692099E−03 | −2.1784809E−03 | −1.8448484E−03 | 1.1662477E−03 |
| 14 | −1.1692062E−01 | 3.8951800E−02 | 6.8860088E−03 | 9.3219884E−03 | −5.3136187E−03 |
| 15 | −1.7656708E−02 | −1.7260004E−02 | 1.3603145E−02 | −4.0535179E−03 | 4.7752170E−04 |

TABLE 5

Example 3
f = 2.992, Bf = 0.932, Fno. = 2.48, 2ω = 77.0

| Si | Ri | Di | Ndj | vdj |
|---|---|---|---|---|
| *1 | −8.11698 | 0.255 | 1.54488 | 54.87 |
| *2 | 5.26525 | 0.454 | | |
| *3 | 1.43383 | 0.495 | 1.58321 | 59.10 |
| *4 | 5.97799 | 0.206 | | |
| *5 | 2.88146 | 0.271 | 1.63350 | 23.62 |
| *6 | 1.70820 | 0.258 | | |
| 7 (St) | ∞ | 0.030 | | |
| *8 | 5.92541 | 0.643 | 1.54488 | 54.87 |
| *9 | −1.67891 | 0.277 | | |
| *10 | −2.09769 | 0.252 | 1.63350 | 23.62 |
| *11 | −11.07692 | 0.141 | | |
| *12 | 3.54112 | 0.640 | 1.54488 | 54.87 |
| *13 | −1.11158 | 0.263 | | |
| *14 | −0.97521 | 0.254 | 1.54488 | 54.87 |
| *15 | 3.99986 | 0.300 | | |
| 16 | ∞ | 0.250 | 1.51633 | 64.14 |
| 17 | ∞ | 0.467 | | |
| 18 (IMG) | ∞ | | | |

*Aspherical Surface

TABLE 6

Example 3 · Aspherical Surface Data

| Si | KA | A3 | A4 | A5 | A6 |
|---|---|---|---|---|---|
| 1 | -3.7309634E+00 | 0.0000000E+00 | 6.6388427E-02 | -3.2288776E-02 | -8.3913866E-03 |
| 2 | 4.8234820E+00 | 0.0000000E+00 | -4.3214749E-02 | -2.4817086E-02 | 3.8132153E-02 |
| 3 | -4.4015081E+00 | 0.0000000E+00 | 1.1985914E-01 | -3.2490551E-02 | -2.3046666E-02 |
| 4 | 4.4712603E+00 | 0.0000000E+00 | 1.0457662E-01 | -1.1570399E-02 | -2.8571435E-01 |
| 5 | 5.8458207E+00 | 0.0000000E+00 | 1.1973882E-02 | 2.5691314E-01 | -1.0416366E+00 |
| 6 | 5.2784180E+00 | 0.0000000E+00 | -1.7291813E-01 | 3.1492580E-01 | -7.5817865E-01 |
| 8 | -1.6383112E+01 | 0.0000000E+00 | -1.6311746E-02 | -1.8050680E-02 | 1.1665982E-01 |
| 9 | 2.8966861E+00 | 0.0000000E+00 | -6.4410111E-02 | -2.5116660E-01 | 4.3883403E-01 |
| 10 | 7.5109828E-01 | 0.0000000E+00 | -2.1931088E-01 | 7.5643190E-02 | 1.0084715E+00 |
| 11 | -1.8532279E+00 | 0.0000000E+00 | -3.5818667E-01 | 2.6280284E-01 | 6.1059327E-01 |
| 12 | -1.7035388E+00 | 0.0000000E+00 | -3.6518207E-01 | 3.7291228E-01 | 2.1967062E-01 |
| 13 | -3.1498362E+00 | 0.0000000E+00 | -3.5105404E-02 | 3.2528791E-02 | 1.2680619E-01 |
| 14 | -3.2414251E+00 | 0.0000000E+00 | -1.0275527E-01 | -2.9354479E-02 | 3.1868763E-01 |
| 15 | -1.9999994E+01 | 0.0000000E+00 | -1.0103951E-01 | 5.7720898E-02 | -3.5938840E-02 |

| Si | A7 | A8 | A9 | A10 | A11 |
|---|---|---|---|---|---|
| 1 | 2.1221315E-02 | -1.9881262E-02 | 1.1865058E-02 | -3.6603322E-03 | 1.1056936E-03 |
| 2 | -1.0173353E-03 | -2.2622205E-02 | 3.1581232E-02 | -3.5956027E-02 | 2.6854644E-02 |
| 3 | -5.0035560E-01 | 1.2943305E+00 | -1.8784238E+00 | 2.3499711E+00 | -2.4263101E+00 |
| 4 | 4.3434281E-01 | -5.0847260E-02 | -4.1201536E-01 | 2.0109477E-01 | -3.6242858E-02 |
| 5 | 1.8054392E-01 | 3.6127090E+00 | -5.2627950E+00 | -3.2943305E-01 | 3.7729923E+00 |
| 6 | 2.1142907E+00 | -1.4469976E+01 | 4.4930762E+01 | -5.8462825E+01 | -4.3116936E+01 |
| 8 | -3.7611515E+00 | 1.3141311E+01 | -6.4426903E+00 | -2.7705245E+01 | 4.9237594E+00 |
| 9 | -1.5307926E-01 | 6.2448938E-01 | -3.7525485E+00 | 3.6446422E+00 | 1.1266442E+00 |
| 10 | -2.9602306E+00 | 1.8904655E+00 | 2.9154886E+00 | 4.1005445E-01 | -1.4136704E+01 |
| 11 | -8.3048536E-01 | -7.2210516E-01 | 1.1553219E+00 | 8.2403614E-01 | -6.6327293E-01 |
| 12 | -7.0499874E-01 | 3.8336057E-01 | 3.5845543E-02 | -1.2185094E-01 | 2.2894918E-01 |
| 13 | -1.9013535E-02 | -6.7925126E-02 | -2.8355422E-02 | 4.5198365E-02 | -2.9065377E-02 |
| 14 | -4.9078642E-01 | 7.2470863E-01 | -1.3639167E+00 | 1.9482458E+00 | -1.7513629E+00 |
| 15 | -2.8193923E-02 | 1.1009983E-01 | -9.2358222E-02 | 2.6225409E-02 | -4.7655073E-03 |

| Si | A12 | A13 | A14 | A15 | A16 |
|---|---|---|---|---|---|
| 1 | -1.9759908E-03 | 1.8159773E-03 | -7.2842879E-04 | 1.2840503E-04 | -7.3653014E-06 |
| 2 | -1.1186907E-02 | 2.2011578E-03 | -1.7080610E-05 | -7.1655365E-05 | 1.0041837E-05 |
| 3 | 1.6409211E+00 | -6.3312060E-01 | 1.7523113E-01 | -7.0422985E-02 | 1.8319957E-02 |
| 4 | 1.0503452E-01 | 2.9183168E-01 | -4.8919046E-01 | 1.8520195E-01 | -5.9055546E-03 |
| 5 | -4.8623390E-01 | 1.3424967E+00 | -2.5841539E+00 | -9.5797597E-01 | 1.4116109E+00 |
| 6 | 3.8837560E+02 | -9.2841454E+02 | 1.1593766E+03 | 1.4940446E+02 | -1.8835757E+02 |
| 8 | 7.0749598E+01 | -1.7436696E+01 | -1.6427219E+01 | -1.4858728E+02 | 1.4495331E+02 |
| 9 | -7.1337740E-01 | 1.0642824E+00 | -4.3211501E+00 | -1.2057661E+00 | 3.5919631E+00 |
| 10 | 1.4219394E+01 | 8.3221843E-01 | -7.5329510E-01 | -8.4079232E+00 | 5.0002903E+00 |
| 11 | -1.1411111E+00 | 5.2863718E-01 | 6.1541168E-01 | -3.5180116E-01 | 1.0378700E-02 |
| 12 | -3.8919462E-01 | 2.6359399E-01 | 7.7128586E-03 | -8.0435778E-02 | 2.4468793E-02 |
| 13 | 1.2812915E-02 | 1.6016862E-02 | -1.6101164E-02 | 2.0977014E-03 | 8.8027535E-04 |
| 14 | 1.1555041E+00 | -6.6192336E-01 | 2.7366281E-01 | -5.4298333E-02 | 1.9250550E-03 |
| 15 | 4.4295270E-03 | 6.9396584E-04 | -2.2622211E-03 | 6.6242423E-04 | -2.4811714E-05 |

TABLE 7

Example 4
f = 3.021, Bf = 0.960, Fno. = 2.49, 2ω = 76.4

| Si | Ri | Di | Ndj | vdj |
|---|---|---|---|---|
| *1 | -8.78834 | 0.257 | 1.54488 | 54.87 |
| *2 | 5.27811 | 0.466 | | |
| *3 | 1.42551 | 0.523 | 1.53391 | 55.87 |
| *4 | 6.21473 | 0.200 | | |
| *5 | 2.84562 | 0.259 | 1.63350 | 23.62 |
| *6 | 1.70903 | 0.256 | | |
| 7 (St) | ∞ | 0.030 | | |
| *8 | 5.56089 | 0.645 | 1.54488 | 54.87 |
| *9 | -1.66950 | 0.291 | | |
| *10 | -2.11336 | 0.254 | 1.63350 | 23.62 |
| *11 | -10.54127 | 0.143 | | |
| *12 | 3.50798 | 0.643 | 1.53391 | 55.87 |
| *13 | -1.10982 | 0.278 | | |
| *14 | -0.97406 | 0.260 | 1.54488 | 54.87 |
| *15 | 4.05067 | 0.300 | | |
| 16 | ∞ | 0.250 | 1.51633 | 64.14 |
| 17 | ∞ | 0.495 | | |
| 18 (IMG) | ∞ | | | |

*Aspherical Surface

TABLE 8

Example 4·Aspherical Surface Data

| Si | KA | A3 | A4 | A5 | A6 |
|---|---|---|---|---|---|
| 1 | −3.7309634E+00 | 0.0000000E+00 | 6.5972106E−02 | −3.8068544E−02 | 9.2210082E−03 |
| 2 | 4.8234820E+00 | 0.0000000E+00 | −4.0526210E−02 | −2.2547860E−02 | 3.1132705E−02 |
| 3 | −4.4015081E+00 | 0.0000000E+00 | 1.1966166E−01 | −5.1119463E−02 | −1.0809342E−02 |
| 4 | 4.4712603E+00 | 0.0000000E+00 | 1.0746980E−01 | −1.7027334E−02 | −2.3015131E−01 |
| 5 | 5.8458207E+00 | 0.0000000E+00 | 8.9487313E−03 | 3.0058713E−01 | −1.5989758E+00 |
| 6 | 5.2784180E+00 | 0.0000000E+00 | −1.8599519E−01 | 3.3456405E−01 | −6.9944875E−01 |
| 8 | −1.6383112E+01 | 0.0000000E+00 | −6.9485142E−02 | −2.0124250E−02 | 9.7443894E−01 |
| 9 | 2.8966861E+00 | 0.0000000E+00 | −2.8886267E−02 | −2.3335224E−01 | −6.8260093E−02 |
| 10 | 7.5109828E−01 | 0.0000000E+00 | −2.1021834E−01 | 4.3273787E−02 | 1.5103157E+00 |
| 11 | −1.8532279E+00 | 0.0000000E+00 | −3.6772006E−01 | 2.5654757E−01 | 7.1152055E−01 |
| 12 | −1.7035388E+00 | 0.0000000E+00 | −3.8773122E−01 | 4.1117453E−01 | 8.0838473E−02 |
| 13 | −3.1498362E+00 | 0.0000000E+00 | −2.7549041E−02 | 2.9851261E−02 | 1.1984737E−01 |
| 14 | −3.2414251E+00 | 0.0000000E+00 | −9.3725998E−02 | −1.9009638E−02 | 1.5929723E−01 |
| 15 | −1.9999994E+01 | 0.0000000E+00 | −1.0436500E−01 | 6.8304565E−02 | −5.5800486E−02 |

| Si | A7 | A8 | A9 | A10 | A11 |
|---|---|---|---|---|---|
| 1 | −5.0336415E−03 | 4.3206676E−03 | −1.7503786E−03 | 6.5648296E−04 | −7.5379652E−04 |
| 2 | 1.7716706E−03 | −1.1477278E−02 | 3.2030574E−03 | −1.0038446E−03 | 1.4104104E−03 |
| 3 | −4.0197943E−01 | 7.0901855E−01 | −2.1942926E−01 | −3.6576115E−01 | 3.0392397E−01 |
| 4 | 3.3354181E−01 | −2.8637246E−02 | −1.7363300E−01 | −3.9365341E−01 | 5.2066324E−01 |
| 5 | 2.7627621E+00 | −2.3496657E+00 | −2.1331448E−01 | 8.1106504E+00 | −2.5816499E+01 |
| 6 | 1.1391202E+00 | −6.5453638E+00 | 8.8875323E+00 | 2.3117768E+01 | −6.5610529E+01 |
| 8 | −4.7980754E+00 | 1.5556020E+01 | −4.4652054E+01 | 7.9164964E+01 | 2.5478411E+01 |
| 9 | 3.8268305E−01 | 1.3208562E+00 | −9.8160881E−01 | −4.7842693E+00 | −4.8061551E+00 |
| 10 | −5.6523475E+00 | 9.2800726E+00 | −8.7069448E+00 | 1.0401172E+01 | −1.8041069E+01 |
| 11 | −1.1430366E+00 | −1.7934231E−02 | 1.2890874E−01 | 1.6386409E+00 | −1.0074488E+00 |
| 12 | −1.0152440E−01 | −8.8213156E−01 | 1.3122789E+00 | −5.9329553E−01 | 1.2212992E−01 |
| 13 | −8.3413386E−02 | 9.5036064E−02 | −1.3918391E−01 | 5.7286387E−02 | −5.6657894E−02 |
| 14 | −1.0857807E−02 | −2.0992187E−01 | 7.7143077E−02 | 1.6675541E−01 | −5.2263471E−02 |
| 15 | 2.8433297E−02 | 1.5594239E−02 | −1.2532809E−03 | −3.7129402E−02 | 3.7131846E−02 |

| Si | A12 | A13 | A14 | A15 | A16 |
|---|---|---|---|---|---|
| 1 | 3.9112227E−04 | 5.6172113E−06 | −3.2493868E−05 | −3.9594460E−06 | 2.5821213E−06 |
| 2 | −1.5524295E−04 | −3.7919943E−04 | 1.6949256E−04 | −3.1303888E−05 | 3.2281180E−06 |
| 3 | −6.5835541E−02 | −2.8697919E−03 | 7.2890690E−02 | −8.3199886E−02 | 2.4806621E−02 |
| 4 | 1.8072732E−01 | −2.9925966E−01 | 2.5151995E−02 | −2.1237428E−02 | 2.9379552E−02 |
| 5 | 3.5432333E+01 | −1.6071017E+01 | −6.0081513E+00 | 5.8995116E+00 | −5.3552243E−01 |
| 6 | 3.8749515E+01 | −2.4455378E+00 | 2.3970618E+01 | 1.3235598E+01 | −4.4438679E+01 |
| 8 | −4.7811276E+02 | 1.0754454E+03 | −1.2072226E+03 | 7.5233419E+02 | −2.2254708E+02 |
| 9 | 2.3336708E+01 | −3.8840724E+00 | −1.9478515E+01 | 1.1430958E+00 | 8.2604006E+00 |
| 10 | 1.8517238E+01 | −1.3304487E+01 | 1.8315742E+01 | −1.9981987E+01 | 7.7089053E+00 |
| 11 | −8.4548382E−01 | 3.8620729E−03 | 1.1314542E+00 | −6.1928365E−01 | 7.0605785E−02 |
| 12 | −5.4927702E−01 | 8.8939659E−01 | −5.9003158E−01 | 1.7834778E−01 | −1.9683551E−02 |
| 13 | 6.6626334E−02 | −1.3791681E−02 | −3.2209898E−03 | −5.6721681E−03 | 3.0099107E−03 |
| 14 | −5.4407888E−02 | −3.8077688E−02 | 5.1805131E−02 | −5.2396076E−03 | −3.1633250E−03 |
| 15 | −2.1632913E−02 | 1.3107559E−02 | −6.4208638E−03 | 1.5947423E−03 | −1.3078233E−04 |

TABLE 9

Example 5
f = 2.990, Bf = 0.950, Fno. = 2.48, 2ω = 77.0

| Si | Ri | Di | Ndj | vdj |
|---|---|---|---|---|
| *1 | −8.66136 | 0.255 | 1.54488 | 54.87 |
| *2 | 5.27973 | 0.466 | | |
| *3 | 1.42663 | 0.519 | 1.54367 | 56.05 |
| *4 | 6.12990 | 0.200 | | |
| *5 | 2.85892 | 0.258 | 1.63350 | 23.62 |
| *6 | 1.70795 | 0.256 | | |
| 7 (St) | ∞ | 0.030 | | |
| *8 | 5.67657 | 0.644 | 1.54488 | 54.87 |
| *9 | −1.67067 | 0.289 | | |
| *10 | −2.10572 | 0.252 | 1.63350 | 23.62 |
| *11 | −10.76902 | 0.141 | | |
| *12 | 3.52673 | 0.641 | 1.54367 | 56.05 |
| *13 | −1.11112 | 0.277 | | |
| *14 | −0.97225 | 0.258 | 1.54488 | 54.87 |
| *15 | 3.99984 | 0.300 | | |
| 16 | ∞ | 0.250 | 1.51633 | 64.14 |
| 17 | ∞ | 0.485 | | |
| 18 (IMG) | ∞ | | | |

*Aspherical Surface

TABLE 10

| | Example 5·Aspherical Surface Data | | | | |
|---|---|---|---|---|---|
| Si | KA | A3 | A4 | A5 | A6 |
| 1 | −3.7309634E+00 | 0.0000000E+00 | 6.6519826E−02 | −3.8240701E−02 | 9.5160172E−03 |
| 2 | 4.8234820E+00 | 0.0000000E+00 | −4.0464301E−02 | −2.4690945E−02 | 3.8484723E−02 |
| 3 | −4.4015081E+00 | 0.0000000E+00 | 1.2718510E−01 | −1.1278434E−01 | 3.3805097E−01 |
| 4 | 4.4712603E+00 | 0.0000000E+00 | 1.0370201E−01 | −1.4690939E−02 | −2.4026956E−01 |
| 5 | 5.8458207E+00 | 0.0000000E+00 | 1.2779772E−02 | −3.0925249E−03 | 1.0349385E+00 |
| 6 | 5.2784180E+00 | 0.0000000E+00 | −1.8941575E−01 | 3.2344767E−01 | −5.1452141E−01 |
| 8 | −1.6383112E+01 | 0.0000000E+00 | −3.8864643E−02 | −1.1454962E−02 | 5.2623956E−01 |
| 9 | 2.8966861E+00 | 0.0000000E+00 | −3.7960719E−02 | −2.4118651E−01 | 1.0121578E−01 |
| 10 | 7.5109828E−01 | 0.0000000E+00 | −2.1393809E−01 | 1.1835556E−01 | 8.4459327E−01 |
| 11 | −1.8532279E+00 | 0.0000000E+00 | −3.6452730E−01 | 2.7423939E−01 | 5.7085485E−01 |
| 12 | −1.7035388E+00 | 0.0000000E+00 | −3.7814779E−01 | 3.9469685E−01 | 1.9286035E−01 |
| 13 | −3.1498362E+00 | 0.0000000E+00 | −2.9082452E−02 | 2.2367614E−02 | 1.3936095E−01 |
| 14 | −3.2414251E+00 | 0.0000000E+00 | −9.3438648E−02 | −1.0597781E−03 | 5.9907234E−02 |
| 15 | −1.9999994E+01 | 0.0000000E+00 | −1.0426667E−01 | 6.9623442E−02 | −6.2556860E−02 |

| Si | A7 | A8 | A9 | A10 | A11 |
|---|---|---|---|---|---|
| 1 | −6.2792793E−03 | 5.0632948E−03 | −7.2407743E−04 | −9.5672882E−04 | 1.5390328E−04 |
| 2 | −1.4478283E−02 | 1.3498719E−02 | −2.3879596E−02 | 1.9990238E−02 | −1.0157752E−02 |
| 3 | −1.5166796E+00 | 2.7934260E+00 | −2.5176472E+00 | 1.0094472E+00 | 5.9291291E−03 |
| 4 | 4.1786170E−01 | −1.8630059E−01 | −2.1423972E−01 | 3.6080194E−03 | 1.0302844E−01 |
| 5 | −9.1530455E+00 | 2.9655163E+01 | −4.8733979E+01 | 3.6287815E+01 | 1.4873225E+00 |
| 6 | 2.0972968E−01 | −2.8694887E+00 | −1.5276159E+00 | 3.6460385E+01 | −4.8368040E+01 |
| 8 | −3.5181562E+00 | 7.9883942E+00 | −6.3976245E+00 | 2.1184177E+00 | −1.1713514E+01 |
| 9 | 1.5844513E−01 | 9.6480348E−01 | −3.4761193E−01 | −6.6231938E+00 | 4.2432956E+00 |
| 10 | −2.6094439E+00 | 1.2071064E+00 | 3.8700465E+00 | 2.2850673E−01 | −1.3943731E+01 |
| 11 | −6.3041782E−01 | −1.1584021E+00 | 1.5381108E+00 | 8.4496038E−01 | −8.7182946E−01 |
| 12 | −5.6494917E−01 | −3.2832784E−03 | 5.2699693E−02 | −3.4881366E−01 | 3.7765132E−02 |
| 13 | −9.9803288E−02 | 4.1467203E−02 | 1.0131962E−01 | −4.0242806E−01 | 4.4092713E−01 |
| 14 | 2.5998279E−01 | −6.6748548E−01 | 5.7270495E−01 | −1.4370068E−01 | 1.6745312E−02 |
| 15 | 4.3045798E−02 | 3.4750978E−03 | −1.0941425E−02 | −6.2060860E−04 | −7.6177685E−03 |

| Si | A12 | A13 | A14 | A15 | A16 |
|---|---|---|---|---|---|
| 1 | 1.5581833E−04 | 9.0785836E−06 | −1.3013123E−05 | −1.0660855E−05 | 3.3887589E−06 |
| 2 | 4.1712994E−03 | −1.3490128E−03 | 2.5338320E−04 | −2.1763693E−05 | 1.3527174E−06 |
| 3 | −2.6240533E−02 | −2.4287070E−01 | 3.3943589E−01 | −1.9812289E−01 | 4.3104654E−02 |
| 4 | 3.1483402E−01 | −2.2066717E−01 | −1.0260211E−01 | 5.6660687E−02 | 1.1093197E−02 |
| 5 | −1.7831974E+01 | −5.7853026E−01 | 2.1129590E+01 | −1.9589900E+01 | 6.2037483E+00 |
| 6 | −6.4316234E+01 | 1.9558909E+02 | −1.8698211E+02 | 1.3789323E+02 | −7.6092545E+01 |
| 8 | 2.0808301E+01 | −3.0790821E+01 | 7.9090623E+01 | −9.8519036E+01 | 4.0149165E+01 |
| 9 | 9.7475168E+00 | −1.9614892E+00 | −1.0499385E+01 | −2.9932091E+00 | 7.6176103E+00 |
| 10 | 8.1082756E+00 | 1.5617240E+01 | −1.5836941E+01 | −1.2160394E+00 | 3.7073307E+00 |
| 11 | −1.3096954E+00 | 1.2053950E+00 | −8.7378129E−02 | −2.3225300E−02 | −4.7332007E−02 |
| 12 | −5.2336893E−03 | −2.3045914E−02 | 1.2277841E−01 | −1.0374594E−01 | 2.6040699E−02 |
| 13 | −2.3441237E−01 | 6.4580231E−02 | 7.8255576E−03 | −1.6953869E−02 | 4.8863846E−03 |
| 14 | −2.6837232E−02 | −4.5289313E−02 | 4.1157010E−02 | 1.0337148E−04 | −3.8112884E−03 |
| 15 | 9.6333556E−03 | −1.8406909E−04 | −3.0699318E−03 | 1.1338789E−03 | −1.0246265E−04 |

TABLE 11

| Example 6 f = 2.927, Bf = 0.959, Fno. = 2.46, 2ω = 78.0 | | | | |
|---|---|---|---|---|
| Si | Ri | Di | Ndj | νdj |
| *1 | −8.56383 | 0.255 | 1.54488 | 54.87 |
| *2 | 5.30258 | 0.463 | | |
| *3 | 1.43047 | 0.519 | 1.54488 | 54.87 |
| *4 | 6.05479 | 0.200 | | |
| *5 | 2.88472 | 0.262 | 1.63350 | 23.62 |
| *6 | 1.70842 | 0.252 | | |
| 7 (St) | ∞ | 0.030 | | |
| *8 | 5.79055 | 0.641 | 1.54488 | 54.87 |
| *9 | −1.67747 | 0.291 | | |
| *10 | −2.07679 | 0.252 | 1.63350 | 23.62 |
| *11 | −11.85590 | 0.133 | | |
| *12 | 3.65494 | 0.637 | 1.58321 | 59.10 |

TABLE 11-continued

| Example 6 f = 2.927, Bf = 0.959, Fno. = 2.46, 2ω = 78.0 | | | | |
|---|---|---|---|---|
| Si | Ri | Di | Ndj | νdj |
| *13 | −1.11510 | 0.276 | | |
| *14 | −0.95231 | 0.261 | 1.54488 | 54.87 |
| *15 | 4.07296 | 0.300 | | |
| 16 | ∞ | 0.250 | 1.51633 | 64.14 |
| 17 | ∞ | 0.494 | | |
| 18 (IMG) | ∞ | | | |

*Aspherical Surface

TABLE 12

Example 6-Aspherical Surface Data

| Si | KA | A3 | A4 | A5 | A6 |
|---|---|---|---|---|---|
| 1 | −3.7309634E+00 | 0.0000000E+00 | 6.7050796E−02 | −3.8120233E−02 | 9.6852799E−03 |
| 2 | 4.8234820E+00 | 0.0000000E+00 | −4.1341392E−02 | −2.4560231E−02 | 3.8565212E−02 |
| 3 | −4.4015081E+00 | 0.0000000E+00 | 1.1347461E−01 | −2.7505433E−02 | −1.0758084E−01 |
| 4 | 4.4712603E+00 | 0.0000000E+00 | 1.1084116E−01 | −1.3890358E−02 | −2.5310444E−01 |
| 5 | 5.8458207E+00 | 0.0000000E+00 | 1.1800969E−02 | 2.3891174E−01 | −1.1118459E+00 |
| 6 | 5.2784180E+00 | 0.0000000E+00 | −2.1629839E−01 | 3.9146328E−01 | −6.8302109E−01 |
| 8 | −1.6383112E+01 | 0.0000000E+00 | 2.7292410E−02 | 1.1818228E−02 | −9.1364575E−01 |
| 9 | 2.8966861E+00 | 0.0000000E+00 | −2.5677799E−02 | −1.9881532E−01 | −2.7373704E−01 |
| 10 | 7.5109828E−01 | 0.0000000E+00 | −2.6283960E−01 | 1.5464638E−01 | 1.3284681E+00 |
| 11 | −1.8532279E+00 | 0.0000000E+00 | −3.9045357E−01 | 2.3925238E−01 | 7.6495851E−01 |
| 12 | −1.7035388E+00 | 0.0000000E+00 | −3.7156531E−01 | 3.3798440E−01 | 5.9457174E−01 |
| 13 | −3.1498362E+00 | 0.0000000E+00 | −3.9731025E−02 | 2.3095854E−02 | 1.3191042E−01 |
| 14 | −3.2414251E+00 | 0.0000000E+00 | −1.0383886E−01 | −1.9411282E−02 | 1.8194472E−01 |
| 15 | −1.9999994E+01 | 0.0000000E+00 | −1.0525240E−01 | 8.2200132E−02 | −1.3685556E−01 |

| Si | A7 | A8 | A9 | A10 | A11 |
|---|---|---|---|---|---|
| 1 | −8.5879303E−03 | 9.1105921E−03 | −4.5233783E−03 | 1.2849508E−03 | −5.2282381E−04 |
| 2 | −1.0908173E−02 | 3.7751610E−03 | −9.1233779E−03 | 4.4537275E−03 | 1.0024401E−03 |
| 3 | −5.3397668E−02 | 6.3437012E−02 | 3.0971147E−01 | −3.9747003E−01 | 8.2929675E−02 |
| 4 | 3.6515346E−01 | −3.1198880E−02 | −3.7765006E−01 | 1.9210303E−01 | −2.2605205E−01 |
| 5 | 2.9119107E−01 | 5.1465861E+00 | −1.4508101E+01 | 2.8388164E+01 | −5.4274775E+01 |
| 6 | 4.4108575E+00 | −2.4953939E+01 | 3.9932029E+01 | 1.3058800E+01 | −5.7025440E+01 |
| 8 | −1.8857783E+00 | 1.4089216E+01 | −3.2554505E+00 | −4.0498589E+01 | −2.3836632E+01 |
| 9 | 1.3744451E+00 | −1.3523986E+00 | −5.4570770E−02 | 5.6031642E+00 | −2.5336121E+01 |
| 10 | −3.6396136E+00 | 1.5841473E+00 | 5.2358927E+00 | −4.6814840E+00 | −4.3543790E+00 |
| 11 | −8.0511797E−01 | −9.8191522E−01 | 9.4232375E−01 | 1.2815683E+00 | −3.9444014E−01 |
| 12 | −2.0108386E+00 | 2.9951185E+00 | −3.1436003E+00 | 2.0189628E+00 | −1.7483209E−01 |
| 13 | −1.2511326E−02 | −6.2633939E−02 | −2.0792864E−02 | 7.8164675E−03 | −8.2035377E−03 |
| 14 | −3.5394235E−02 | −1.0989904E−01 | −1.8963071E−01 | 4.6523544E−01 | −1.5424881E−01 |
| 15 | 1.9717892E−01 | −1.6739164E−01 | 9.1243754E−02 | −2.8444030E−02 | 1.1815154E−02 |

| Si | A12 | A13 | A14 | A15 | A16 |
|---|---|---|---|---|---|
| 1 | 4.3838921E−05 | 2.0712749E−04 | −9.1272283E−05 | 3.1493029E−06 | 2.4716744E−06 |
| 2 | −9.1976243E−04 | −2.5523191E−05 | 1.0452964E−04 | −2.4809984E−05 | 2.6171943E−06 |
| 3 | −1.0321683E−02 | 1.3443975E−01 | −7.4096328E−02 | −1.5751739E−02 | 1.1987190E−02 |
| 4 | 7.0168258E−01 | −5.0189749E−01 | 4.2432580E−02 | 5.3834303E−03 | 1.9401404E−02 |
| 5 | 7.7882344E+01 | −6.8114952E+01 | 3.6353470E+01 | −1.3748702E+01 | 3.3667282E+00 |
| 6 | −2.0425915E+01 | 3.0822553E+01 | 2.0533446E+01 | 1.1273039E+02 | −1.3581645E+02 |
| 8 | 6.2438411E+01 | 4.0497407E+02 | −8.3069349E+02 | 3.8574521E+02 | 5.7127101E+01 |
| 9 | 3.4029355E+01 | 6.2732633E+00 | −4.1851019E+01 | 2.2005031E+01 | −1.6837670E+01 |
| 10 | 2.3490331E+00 | 6.8170386E+00 | 2.4876805E+00 | −1.0285565E+01 | 5.3890846E+00 |
| 11 | −1.5741735E+00 | 3.3644705E−01 | 9.4765939E−01 | −4.4659388E−01 | 1.3852203E−02 |
| 12 | −7.8960175E−01 | 4.0248347E−01 | 1.8155912E−01 | −2.1605678E−01 | 5.2892943E−02 |
| 13 | 2.3899939E−02 | −8.1556336E−05 | −7.2735394E−03 | −1.3411543E−01 | 1.5665538E−03 |
| 14 | −1.6056760E−01 | 1.1260437E−01 | −3.4103655E−02 | 2.0307485E−02 | −6.4320989E−03 |
| 15 | −3.4386196E−02 | 4.2860763E−02 | −2.3885900E−02 | 6.2115142E−03 | −6.0536904E−04 |

TABLE 13

Values of Conditional Expressions

| Expression No. | Conditional Expression | Example 1 | Example 2 | Example 3 | Example 4 | Example 5 | Example 6 |
|---|---|---|---|---|---|---|---|
| 1 | vP1 − vN1 | 31.25 | 31.25 | 35.48 | 32.25 | 32.43 | 31.25 |
| 2 | vP2 − vN2 | 31.25 | 31.25 | 31.25 | 32.25 | 32.43 | 35.48 |
| 3 | f/f67 | 0.25 | 0.30 | 0.23 | 0.22 | 0.25 | 0.35 |
| 4 | f/f12 | 0.47 | 0.49 | 0.52 | 0.47 | 0.47 | 0.46 |
| 5 | D2/(f · tanω) | 0.196 | 0.205 | 0.191 | 0.196 | 0.196 | 0.195 |
| 6 | f/f1 | −0.50 | −0.48 | −0.51 | −0.50 | −0.50 | −0.49 |
| 7 | f/f7 | −2.11 | −2.14 | −2.12 | −2.14 | −2.12 | −2.10 |

The paraxial radius of curvature, surface distance, refractive index, and Abbe number described above were obtained by an optical measurement expert through measurement by the following method.

The paraxial radius of curvature was obtained in the following steps by measuring the lens using an ultra-accuracy 3-D profilometer, UA3P (product of Panasonic Factory Solutions Corporation). A paraxial radius of curvature $R_m$ (m is a natural number) and a cone constant $K_m$ are tentatively set and inputted to the UA3P and an $n^{th}$ order aspherical surface coefficient An of the aspherical surface shape formula is calculated from these and measurement data using an auxiliary fitting function of the UA3P. It is assumed, in the aspherical surface shape formula (A), that $C=1/R_m$ and $KA=K_m-1$. From $R_m$, $K_m$, An, and the aspherical surface shape formula, a depth Z of the aspherical surface in an optical axis direction according to the height h from the optical axis is calculated. A difference between a calculated depth Z and a measured depth Z' is obtained at each height h from the optical axis, then a determination is made whether or not the difference is within a predetermined range, and if the difference is within the predetermined range, the set $R_m$ is taken as the paraxial radius of curvature. On the other hand, if the difference is outside of the predetermined range, at least one of the values of $R_m$ and $K_m$ used in the calculation of the difference is set to $R_{m+1}$ and $K_{m+1}$ and inputted to the UA3P, then processing identical to that described above is performed, and determination processing whether or not a difference between a calculated depth Z and a measured depth Z' at each height h from the optical axis is within the predetermined range is repeated until the difference between the calculated depth Z and the measured depth Z' at each height h from the optical axis remains within the predetermined range. The term, within a predetermined range, as used herein refers to within 200 nm. The range of h is a range corresponding to 0 to ⅕ of the maximum outer diameter.

The surface distance was obtained by performing measurement using a thickness and distance measuring device for coupling lenses, OptiSurf (product of Trioptics).

The refractive index was obtained by measuring a test object with the temperature of the test object being maintained at 25° C. using a precision refractometer, KPR-2000 (product of Shimadzu Corporation). The refractive index measured at the d-line (wavelength 587.6 nm) is taken as Nd. Likewise, the refractive indices measured at the e-line (wavelength 546.1 nm), the F-line (wavelength 486.1 nm), the C-line (wavelength 656.3 nm) and the g-line (wavelength 435.8 nm) are taken as Ne, NF, NC, and Ng respectively. The Abbe number vd with respect to the d-line was obtained by substituting the Nd, NF, and NC obtained by the aforementioned measurements in a formula, $vd=(Nd-1)/(NF-NC)$.

What is claimed is:

1. An imaging lens consisting of seven lenses, composed of, in order from the object side, a first lens having a negative refractive power with the object side surface having a concave shape, a second lens, a third lens, a fourth lens, a fifth lens, a sixth lens, and a seventh lens having a negative refractive power with the image side surface having a concave shape with at least one inflection point located radially inward of the intersection between the image side surface and the principal ray of the maximum angle of view, wherein:
   an aperture stop is provided between the first lens and the fifth lens;
   one of the second lens and the third lens has a positive refractive power and the other of the second lens and the third lens has a negative refractive power;
   one of the fifth lens and the sixth lens has a positive refractive power and the other of the fifth lens and the sixth lens has a negative refractive power;
   and the following conditional expressions are satisfied:

$$30 < vP1 - vN1 < 50 \quad (1)$$

$$30 < vP2 - vN2 < 50 \quad (2)$$

where
   vP1 is the Abbe number of either one of the second lens and the third lens having a positive refractive power with respect to the d-line;
   vN1 is the Abbe number of either one of the second lens and the third lens having a negative refractive power with respect to the d-line;
   vP2 is the Abbe number of either one of the fifth lens and the sixth lens having a positive refractive power with respect to the d-line; and
   vN2 is the Abbe number of either one of the fifth lens and the sixth lens having a negative refractive power with respect to the d-line.

2. The imaging lens of claim 1, wherein the aperture stop is located between the third lens and the fourth lens, or between the fourth lens and the fifth lens.

3. The imaging lens of claim 1, wherein the fifth lens has a negative refractive power and the sixth lens has a positive refractive power.

4. The imaging lens of claim 1, wherein the following conditional expression is further satisfied:

$$0 < f/f67 < 2 \quad (3)$$

where:
   f is the focal length of the entire system; and
   f67 is the combined focal length of the sixth lens and the seventh lens.

5. The imaging lens of claim 1, wherein the sixth lens has a biconvex shape.

6. The imaging lens of claim 1, wherein the seventh lens has a biconcave shape.

7. The imaging lens of claim 1, wherein the second lens has a positive refractive power and the third lens has a negative refractive power.

8. The imaging lens of claim 1, wherein the following conditional expression is further satisfied:

$$0 < f/f12 < 2 \quad (4)$$

where:
   f is the focal length of the entire system; and
   f12 is the combined focal length of the first lens and the second lens.

9. The imaging lens of claim 1, wherein the following conditional expression is further satisfied:

$$0.1 < D2/(f \cdot \tan \omega) < 0.3 \quad (5)$$

where:
   D2 is the distance between the first lens and the second lens on the optical axis;
   f is the focal length of the entire system; and
   ω is the maximum half angle of view when an object at infinity is in focus.

10. The imaging lens of claim 1, wherein the following conditional expression is further satisfied:

$$-2 < f/f1 < 0 \quad (6)$$

where:
   f is the focal length of the entire system; and
   f1 is the focal length of the first lens.

11. The imaging lens of claim 1, wherein the following conditional expression is further satisfied:

$$-3 < f/f7 < 0 \quad (7)$$

where:
   f is the focal length of the entire system; and
   f7 is the focal length of the seventh lens.

12. The imaging lens of claim 1, wherein the fourth lens has a positive refractive power.

13. The imaging lens of claim 1, wherein the object side surface of the first lens has at least one inflection point located radially inward of the intersection between the object side surface and the principal ray of the maximum angle of view.

14. The imaging lens of claim 1, wherein the following conditional expression is further satisfied:

$$30 < vP1 - vN1 < 40 \quad (1\text{-}1).$$

15. The imaging lens of claim 1, wherein the following conditional expression is further satisfied:

$$30 < vP2 - vN2 < 40 \quad (2\text{-}1).$$

16. The imaging lens of claim 4, wherein the following conditional expression is further satisfied:

$$0 < f/f67 < 1 \quad (3\text{-}1)$$

where:
f is the focal length of the entire system; and
f67 is the combined focal length of the sixth lens and the seventh lens.

17. The imaging lens of claim 8, wherein the following conditional expression is further satisfied:

$$0 < f/f12 < 1 \quad (4\text{-}1)$$

where:
f is the focal length of the entire system; and
f12 is the combined focal length of the first lens and the second lens.

18. The imaging lens of claim 10, wherein the following conditional expression is further satisfied:

$$-1 < f/f1 < 0 \quad (6\text{-}1)$$

where:
f is the focal length of the entire system; and
f1 is the focal length of the first lens.

19. The imaging lens of claim 11, wherein the following conditional expression is further satisfied:

$$-2.5 < f/f7 < -1 \quad (7\text{-}1)$$

where:
f is the focal length of the entire system; and
f7 is the focal length of the seventh lens.

20. An imaging apparatus equipped with the imaging lens of claim 1.

\* \* \* \* \*